US006208744B1

(12) United States Patent
Ishige et al.

(10) Patent No.: US 6,208,744 B1
(45) Date of Patent: *Mar. 27, 2001

(54) DOCUMENT IMAGE PROCESSOR AND METHOD FOR SETTING A DOCUMENT FORMAT CONFORMING TO A DOCUMENT IMAGE

(75) Inventors: Yoshiki Ishige; Masaharu Kadokura; Yuuji Ishii; Kenji Yoshizawa, all of Tokyo (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/570,407

(22) Filed: Dec. 11, 1995

(30) Foreign Application Priority Data

Dec. 14, 1994 (JP) ........ 6-332367
Jan. 18, 1995 (JP) ........ 7-024763
Jan. 18, 1995 (JP) ........ 7-024764

(51) Int. Cl.[7] ........ G06K 9/00

(52) U.S. Cl. ........ 382/100; 358/1.18; 382/190; 707/518

(58) Field of Search ........ 382/112, 113, 382/178, 175, 100, 190; 395/148, 144, 145, 147, 761, 762, 771, 779; 707/510, 520, 102, 518; 358/517, 541, 1.18, 296, 400

(56) References Cited

U.S. PATENT DOCUMENTS 4,503,556 * 3/1985 Scherl et al. ........ 382/176
5,185,854 * 2/1993 Yoshida et al. ........ 358/1.18
5,191,612 * 3/1993 Katsuyama et al. ........ 382/171
5,220,649 * 6/1993 Forcier ........ 707/541
5,235,653 * 8/1993 Nakano et al. ........ 382/175
5,285,504 * 2/1994 Pavlidis et al. ........ 382/176
5,299,303 * 3/1994 Fukunaga ........ 707/518
5,337,406 * 8/1994 Takakura et al. ........ 707/520
5,392,130 * 2/1995 Mahoney ........ 358/400
5,425,138 * 6/1995 Kumakawa ........ 707/510
5,497,432 * 3/1996 Nishida ........ 382/178
5,506,918 * 4/1996 Ishitani ........ 382/289
5,526,447 * 6/1996 Shepard ........ 382/311
5,557,787 * 9/1996 Shin et al. ........ 707/102
5,596,657 * 1/1997 Choi ........ 382/227
5,610,720 * 3/1997 Fujioka et al. ........ 358/296
5,686,960 * 11/1997 Sussman et al. ........ 348/218
5,701,500 * 12/1997 Ikeo et al. ........ 707/517
5,740,028 * 4/1998 Sugiyama et al. ........ 700/1
5,765,176 * 6/1998 Bloomberg ........ 707/514

* cited by examiner

*Primary Examiner*—Jon Chang
*Assistant Examiner*—Jayanti K. Patel
(74) *Attorney, Agent, or Firm*—Frishauf, Holtz, Goodman, Langer & Chick, P.C.

(57) ABSTRACT

A document image processor reads data on the image of an original document and automatically sets a format for the document in a document processor such as a word processor or personal computer. First, an image scanner reads a document as image data. A character recognizer recognizes and encodes a character from the read image data, and a document processor stores the encoded document data into a document memory. When the character recognizer encodes the image data, it analyzes the structure of the document. The document processor produces format information on the basis of the result of the analysis, and sets the produced format information in the document format memory in correspondence to document data in the document memory. Thus, the document image processor reads a document image from the document, encodes the image, and sets a format for a document conforming exactly to the document image in correspondence to the encoded document data.

4 Claims, 30 Drawing Sheets

CHARACTER INFORMATION TABLE 5

| | CHARACTER CODE | STARTING COORDINATES | ENDING COORDINATES | CHARACTER DIRECTION |
|---|---|---|---|---|
| ① | A | ( $X_0$ , $Y_0$ ) | ( $X_1$ , $Y_1$ ) | –Y |
| ② | B | ( $X_2$ , $Y_2$ ) | ( $X_3$ , $Y_3$ ) | –Y |
| ③ | C | ( $X_4$ , $Y_4$ ) | ( $X_5$ , $Y_5$ ) | –Y |
| ④ | D | ( $X_6$ , $Y_6$ ) | ( $X_7$ , $Y_7$ ) | –Y |
| | | ⋮ | | |

RECOGNITION RESULT TABLE

| | | 2BYTES | 2BYTES | 2BYTES | 2BYTES | 2BYTES |
|---|---|---|---|---|---|---|
| | 0 | CHARACTER CODE | TOP LEFT x | TOP LEFT y | BOTTOM RIGHT x | BOTTOM RIGHT y |
| CHARACTER POSITION INFORMATION | 1 | CHARACTER CODE | TOP LEFT x | TOP LEFT y | BOTTOM RIGHT x | BOTTOM RIGHT y |
| | ⋮ | | | | | |
| NEW LINE INFORMATION | n 0 | NEW LINE | TOP LEFT x | TOP LEFT y | BOTTOM RIGHT x | BOTTOM RIGHT y |
| | ⋮ | | | | | |
| | 0 | CHARACTER CODE | TOP LEFT x | TOP LEFT y | BOTTOM RIGHT x | BOTTOM RIGHT y |
| | ⋮ | | | | | |
| | n | NEW LINE | TOP LEFT x | TOP LEFT y | BOTTOM RIGHT x | BOTTOM RIGHT y |

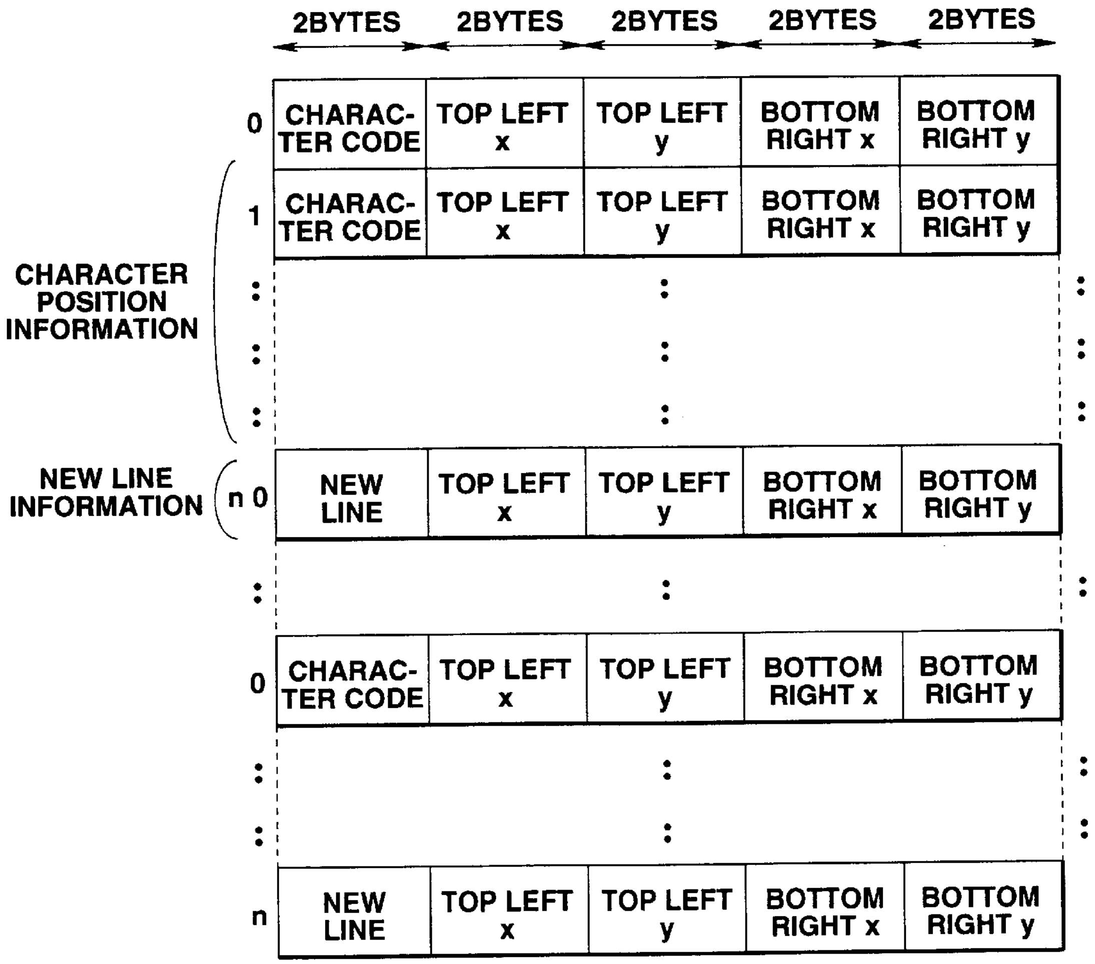

FIG.11

LINE INFORMATION TABLE

| | 2BYTES | 2BYTES | 2BYTES | 2BYTES | 2BYTES | 2BYTES | 2BYTES | 2BYTES | 2BYTES |
|---|---|---|---|---|---|---|---|---|---|
| n 0 | LINE POSITION | CHARACTER NO. | CHARACTER NO. | x SIZE | y SIZE | x 0 | y 0 | x 1 | y 1 |
| n 1 | LINE POSITION | CHARACTER NO. | CHARACTER NO. | x SIZE | y SIZE | x 0 | y 0 | x 1 | y 1 |
| n 2 | LINE POSITION | CHARACTER NO. | CHARACTER NO. | x SIZE | y SIZE | x 0 | y 0 | x 1 | y 1 |
| : | | | | | | | | | |

FIRST CHARACTER NO. IN A LINE

END CHARACTER NO. IN THE LINE

FIG.14

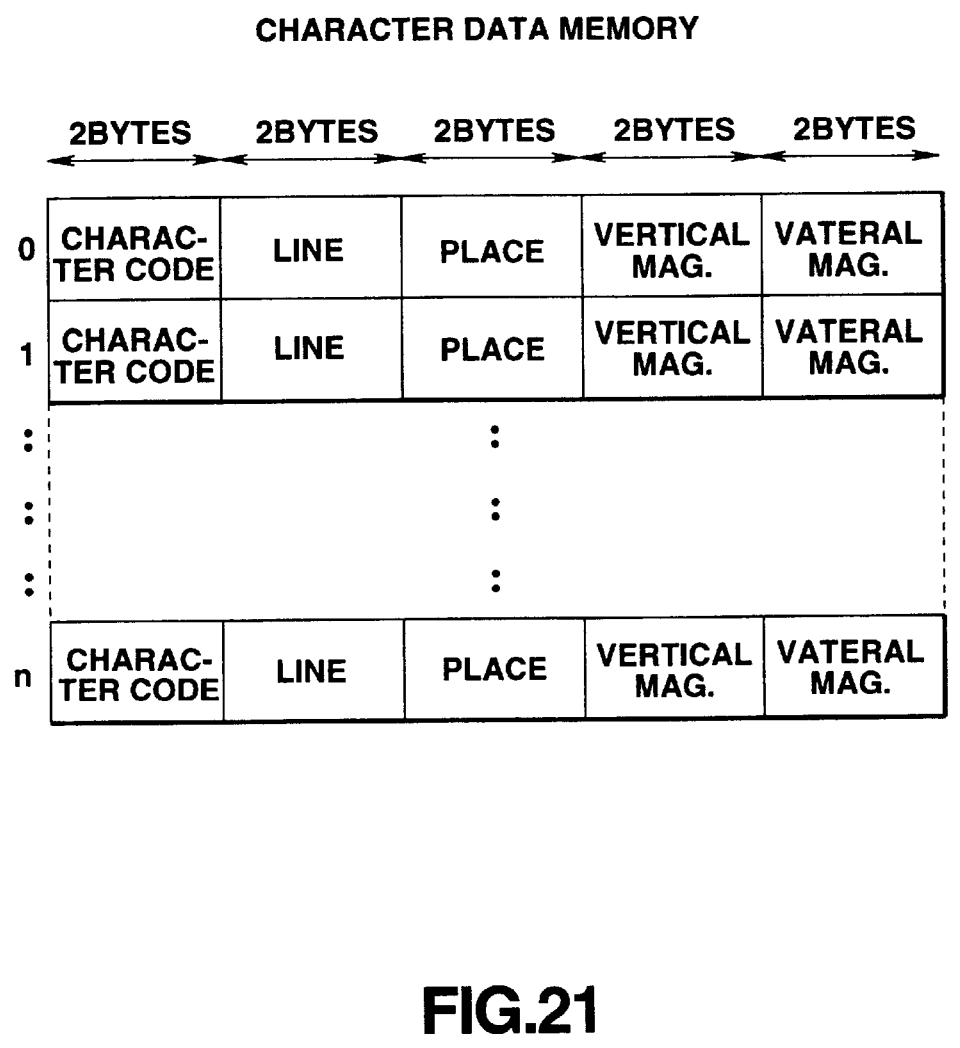

CHARACTER DATA MEMORY

| | 2BYTES | 2BYTES | 2BYTES | 2BYTES | 2BYTES |
|---|---|---|---|---|---|
| 0 | CHARAC-TER CODE | LINE | PLACE | VERTICAL MAG. | VATERAL MAG. |
| 1 | CHARAC-TER CODE | LINE | PLACE | VERTICAL MAG. | VATERAL MAG. |
| : | | | : | | |
| : | | | : | | |
| : | | | : | | |
| n | CHARAC-TER CODE | LINE | PLACE | VERTICAL MAG. | VATERAL MAG. |

FIG.21

RECOGNITION RESULT TABLE
(RULED LINE INFORMATION)

| 2BYTES | 2BYTES | 2BYTES | 2BYTES |
|---|---|---|---|
| TOP LEFT x | TOP LEFT y | BOTTOM RIGHT x | BOTTOM RIGHT y |
| TOP LEFT x | TOP LEFT y | BOTTOM RIGHT x | BOTTOM RIGHT y |
| : | : | : | : |
| TOP LEFT x | TOP LEFT y | BOTTOM RIGHT x | BOTTOM RIGHT y |

RULED LINE DATA MEMORY

RULED LINE KIND CODE

| | | | | |
|---|---|---|---|---|
| LATERAL RULED LINE | STARTING LINE | STARTING PLACE | ENDING LINE | ENDING PALCE |
| LATERAL RULED LINE | STARTING LINE | STARTING PLACE | ENDING LINE | ENDING PALCE |
| LATERAL RULED LINE | STARTING LINE | STARTING PLACE | ENDING LINE | ENDING PALCE |
| | | ⋮ | | |
| LATERAL RULED LINE | STARTING LINE | STARTING PLACE | ENDING LINE | ENDING PALCE |

FIG.25

DOCUMENT IMAGE PROCESSOR AND METHOD FOR SETTING A DOCUMENT FORMAT CONFORMING TO A DOCUMENT IMAGE

BACKGROUND OF THE INVENTION

1. Field of the Invention

The present invention relates generally to document processors such as word processors or personal computers, and more particularly to a document image processor which reads image data of an original document and automatically sets a format for the document.

2. Description of the Background Art

Conventionally, when document data is printed out from a document processor such as a word processor, format information such as, for example, the (vertical/lateral) direction of a sheet of printing paper, a (vertical/lateral) printing direction, and a character size is set in correspondence to the document data.

Conventionally, a document recognizer has been known which scans a printed document to read the image of the document, and which recognizes and encodes the document image.

A method of utilizing the character recognizer has been considered whereby document data encoded by the recognizer is fed to a document processor such as a word processor. In this case, when the document data has been taken in from the recognizer, that format information is required to be newly set in correspondence to the document data.

However, it is very difficult to accurately set various format information so as to harmonize with the document image. That is, an error is likely to occur in the setting of the document information. Thus, this method has a disadvantage in that a document which reproduces the document image as it is can not be printed out.

SUMMARY OF THE INVENTION

According to the present invention, there is provided a document image processor comprising:

- read means for reading a document image from a document;
- character recognition means for recognizing and encoding a character from the document image read by the read means to thereby provide encoded document data;
- document storage means for storing the encoded document data;
- analysis means for analyzing the structure of the document when the character recognition means encodes the character;
- production means for producing format information on the basis of the result of analysis of the structure of the document by the analysis means; and
- setting means for setting the document information produced by the production means in correspondence to the encoded document data stored in the document storage means.

Thus, according to the present invention, the document image is read from the document and encoded. A format for a document accurately conforming to the document image is set in correspondence to the encoded document data, so that no special operations for setting the document format are required to thereby reduce a load on the user. Thus, a printed document reproduces the original document as it is.

BRIEF DESCRIPTION OF THE DRAWINGS

FIGS. 1–32 show first, second and third embodiments of the present invention, wherein:

FIG. 1 is a block diagram of a first embodiment of a document image processor according to the present invention;

FIG. 2 illustrates the structure of a character information table;

FIG. 3 shows a document image in an image memory in correspondence to a plane coordinate system for the image;

FIG. 5 is a flow chart indicative of the algorithm of the operation of a character recognizer;

FIG. 6 is a flow chart continuing from FIG. 5 and showing the algorithm of the operation of a document processor;

FIG. 7 is a block diagram of a second embodiment of the inventive document image processor;

FIG. 8 is a flow chart indicative of a document reading process performed by a CPU of FIG. 7;

FIG. 9 is a flow chart indicative of the document reading process continuing from FIG. 8;

FIG. 10 shows one example of an original document image;

FIG. 11 shows one example of the data structure of character position information and new line information stored in a recognition result table of FIG. 7;

FIG. 12 shows one example of a document format on a document image;

FIG. 13 is a flow chart indicative of a line information table creation process performed during a document reading process;

FIG. 14 shows one example of a line information table created in the line information table creation process of FIG. 13;

FIG. 15 is a flow chart indicative of a line position correction process performed during the document reading process of FIG. 8;

FIG. 16 is a flow chart indicative of a character magnification calculation process performed during the document reading process of FIG. 9;

FIG. 17 is a flow chart indicative of a character magnification correction process performed during the document reading process of FIG. 9;

FIG. 18 shows the relationship between a character font which requires character magnification correction and characters before and after that character font;

FIG. 19 is a flow chart indicative of a place position calculation process performed during the document reading process of FIG. 9;

FIG. 20 shows the relationship between the centers of two characters used to determine the successiveness of the characters when the position of the character place is calculated;

FIG. 21 shows one example of a data structure in a character data memory created in the document reading process of FIG. 9;

FIG. 22 shows one example of the data structure of ruled line position information created in a recognition result table in the document reading process of FIG. 9;

FIG. 23 shows one example of ruled lines on a document image;

FIG. 24 is a flow chart indicative of a ruled-line position calculation process performed in the document reading process of FIG. 9;

FIG. 25 shows one example of a data structure of a ruled-line data memory created in the ruled-line position calculation process of FIG. 24;

FIG. 26 is a block diagram indicative of a third embodiment of the document image processor according to the present invention;

FIG. 27 is a flow chart indicative of a document reading process performed by a CPU of FIG. 26;

FIG. 28 shows one example of the structure of character candidate data and character recognition data stored in a document data memory and a recognition information memory, respectively, in a character recognition process of the document reading process of FIG. 27;

FIG. 29 is flow chart indicative of an automatic format setting process performed by the CPU of FIG. 26;

FIG. 30 is a flow chart indicative of a candidate replacement process performed by a document editor of FIG. 26;

FIG. 31 shows one example of a character candidate window displayed on a display in the candidate replacement process of FIG. 30; and FIG. 32 is a flow chart indicative of a document acceptance process performed by the document editor of FIG. 26.

DESCRIPTION OF THE PREFERRED EMBODIMENTS

First Embodiment

Referring to FIGS. 1–6, the first embodiment of a document image processor according to the present invention will be described below.

Figure 1:
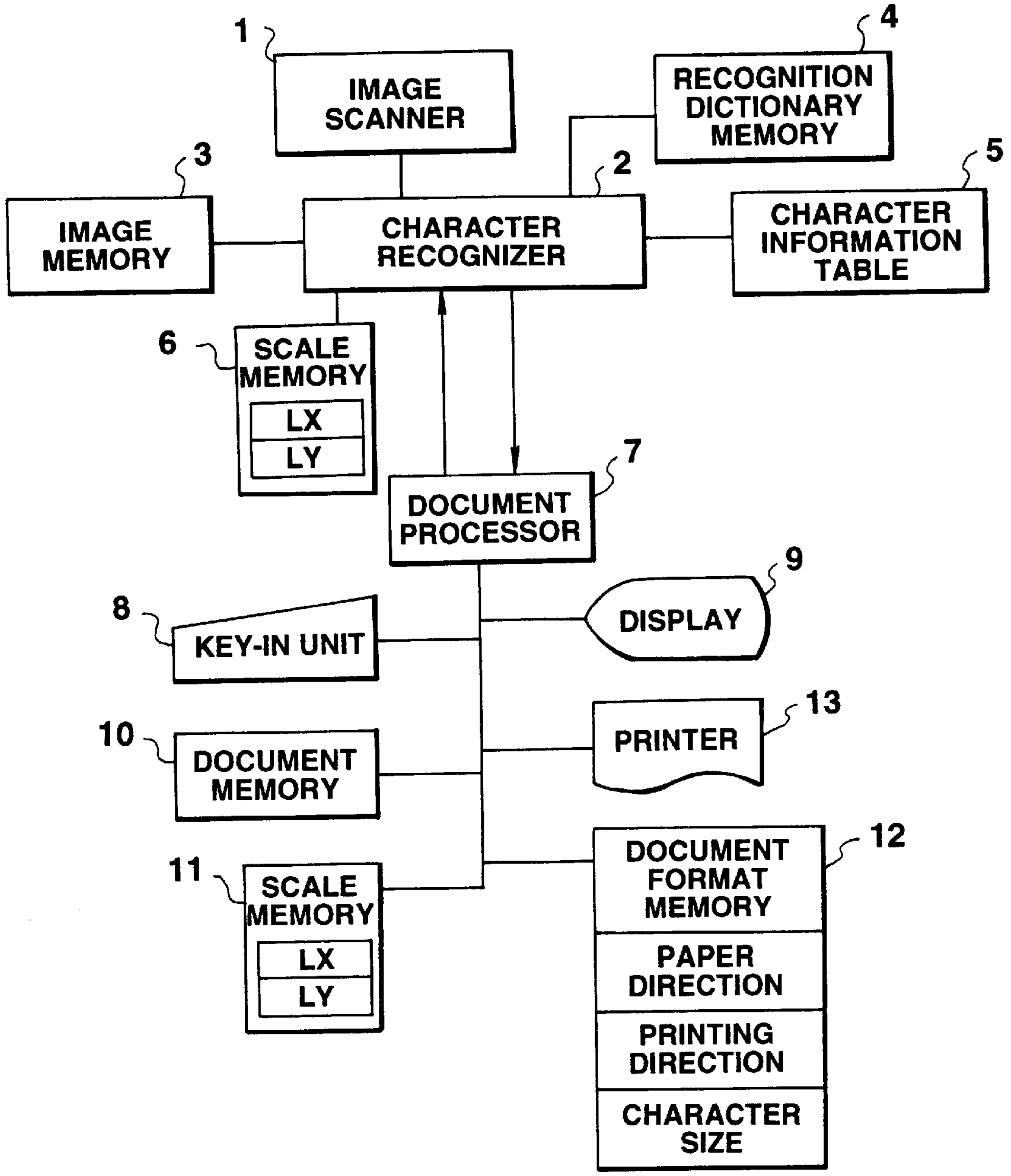

FIG. 1 is a block diagram indicative of the whole structure of a document image processor to which the present invention is applied. A CCD image scanner 1 scans an original document with printed characters/figures thereon and reads image data from the document. For example, the image scanner 1 has a width in which the scanner is capable of reading an A4 sized document in conjunction with a paper feeding mechanism of a printer. Although the scanner 1 may be a handy scanner driven manually, a fixed type scanner is used in the embodiment. The (binary) image data read by the scanner 1 is fed to a character recognizer 2. The arrangement which reads the document as image data is not limited to the CCD image sensor which scans the document and reads the image from the document, as just mentioned above, but may be a CCD camera which picks up the image of the document. The image sensor is not limited to the CCD one, but may be a one which uses a phototransistor or a photodiode.

The operation of the character recognizer 2 is controlled by various programs. The character recognizer 2 stores the image data read by the scanner 1 into an image memory 3, scans the image data in the image memory 3 to analyze the image, extracts an image pattern of each character, and compares the extracted pattern with data in a recognition dictionary memory 4 to recognize and encode the image data. Thus, the encoded character code is stored in a character information table 5. When the character recognizer 2 converts the document image in the image memory 3 read by the scanner 1 to a character code, it extracts an image pattern for each character by recognizing as character area a rectangular area in a bit map in which data on a bit "1" have collected and by cutting out the image pattern in the character area as image data for one character. In addition, the character recognizer 2 analyzes the document structure on the basis of image data in the image memory 3 and senses various parameters for obtaining the direction of arrangement of characters and the directions of the characters in units of one character in order to obtain a document format conforming exactly to the image of the document and to use them as format setting parameters.

The image memory 3 is a bit map memory capable of storing data on a one-page document image read by the scanner 1. The recognition dictionary memory 4 is a read only memory which stores character codes in correspondence to various image patterns. Each time the character recognizer 2 recognizes data in the image memory 3 for each character, the character information table 5 stores the character code, etc., and has a structure of FIG. 2.

As shown in FIG. 2, the character information table 5 stores data on a "character code", "starting coordinates", "ending coordinates" and "direction" of each character. The "starting coordinates" and "ending coordinates" show diagonal coordinates which specify a rectangular (character) area in which bit "1" data have collected relative to the origin of a plane coordinate system spread on the image memory 3. That is, they are coordinate values which specify a character area for each character. When the character recognizer 2 cuts out a one-character image pattern from the image memory 3, the character recognizer 2 senses the starting and ending coordinates of the character area and stores data on those coordinates into the character information table 5.

The "direction of a character" shows the direction in which a character is oriented in the image memory 3. The direction of a character, "−Y", indicates that an upper portion of the character is oriented in the negative direction of the Y axis in a plane coordinate system spread on the image memory 3, as shown by characters "A", "B", . . . , in FIG. 3. Similarly, the character direction of a character, "−X", indicates that an upper portion of the character is oriented in the negative direction of the X axis.

Figure 3:
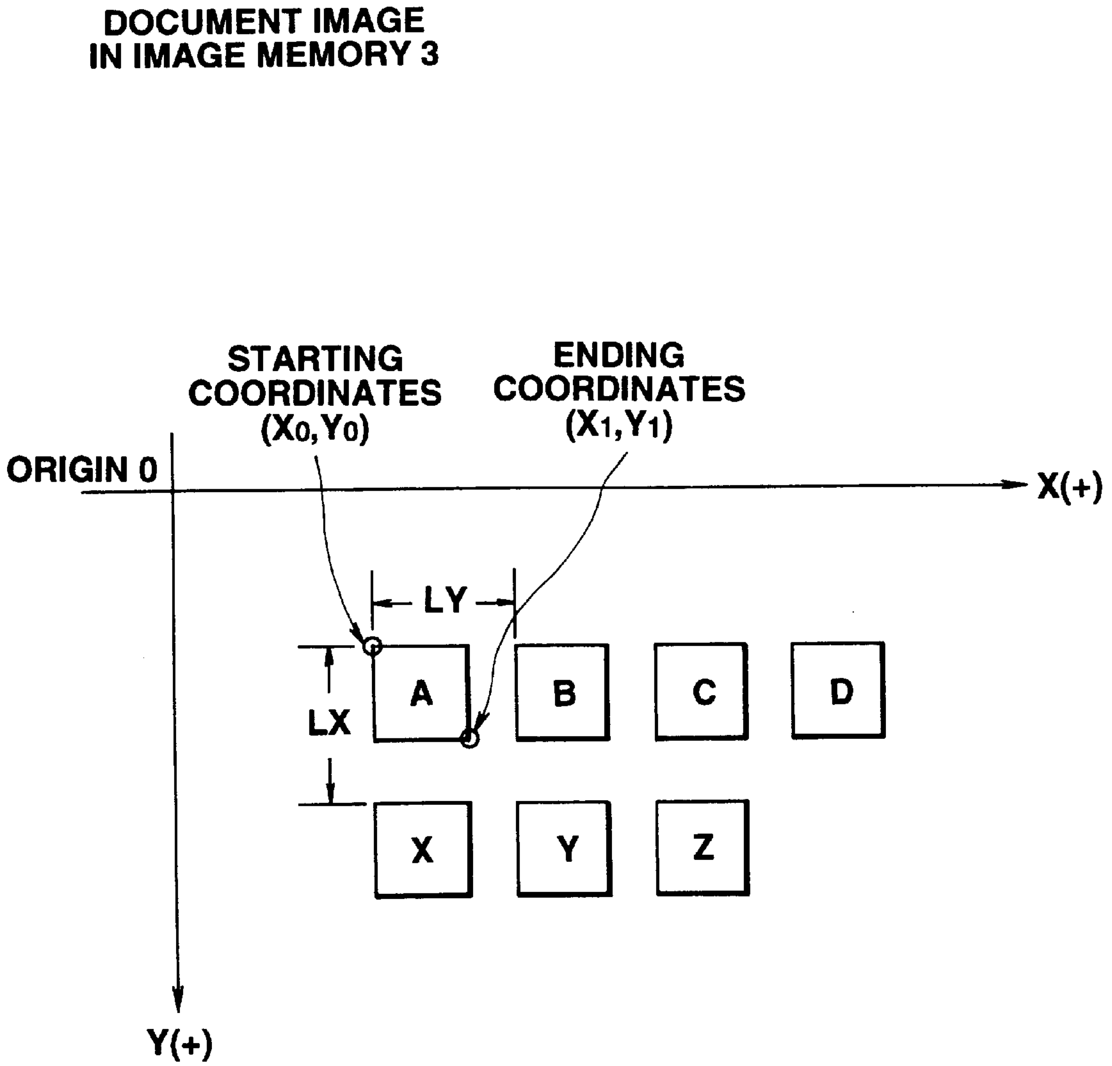

FIG. 3 shows a document image in the image memory 3 with respect to the plane coordinate system with the X and Y axes being positive in the rightward and downward directions, respectively, of FIG. 3. The starting and ending coordinates which specify the character area are the left top and right bottom coordinates, respectively, of the character area, relative to the origin "0" of the coordinate system. In FIG. 3, all the characters "A", "B", "C", . . . , "Z" have the same direction "−Y".

In FIG. 3, "LX" and "LY" express in a dot unit the distances between the starting coordinates of two adjacent areas in the X and Y directions, respectively. The character recognizer 2 analyzes the document structure in the image memory 3 to measure the distances "LX" and "LY" and stores data on the distances in the scale memory 6. The distances "LX" and "LY" are parameters used to obtain the direction of arrangement of the characters, as described above.

The document processor 7 controls verious elements in accordance with various programs. When an image read command is input at a key-in unit 8, the document processor 7 starts up the character recognizer 2. The document processor 7 takes data in the character information table 5 transferred from the character recognizer 2, converts the respective character codes to display fonts, displays them on a text screen of the display 9, and writes the respective character codes in the document memory 10.

When the document processor 7 sets a format for a document in correspondence to the document data in the document memory 10, it takes data in a scale memory 6 transferred from the character recognizer 2, stores it in a scale memory 11 on the side of the document processor 7, senses the direction of arrangement of characters on the basis of the data in the scale memory 11, produces format information about the "vertical" and "horizontal" directions indicative of the direction of a sheet of printing paper, and stores the format information about the direction of the printing paper as such in a document format memory 12. The document processor 7 produces format information about "vertical writing" or "horizontal writing" indicative of the direction of printing on the basis of the "direction of characters" in the character information table 5 transferred from the character recognizer 2, stores the format information about the printing direction as such in the document format memory 12, calculates the respective sizes of the characters from the "starting coordinates" and "ending coordinates" in the character information table 5, and stores the format information about the character sizes as such in the document format memory 12.

Memories such as the image memory 3, document memory 10 and document format memory 12 each are composed of a static RAM, a dynamic RAM, EEPROM, or a storage such as a magnetic disk, photo-magnetic disk or a magnetic tape.

Figure 4A:
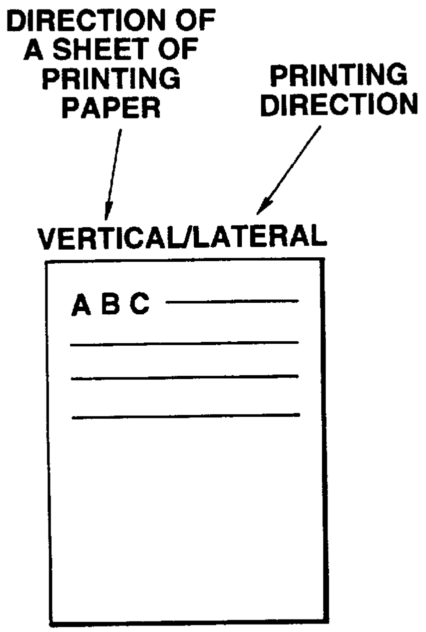
FIGS. 4(A)–4(D) show a one-page image on a document to be printed on the basis of the direction of a sheet of printing paper fed and the printing direction on the printing paper as a printing format.
Figure 4B:
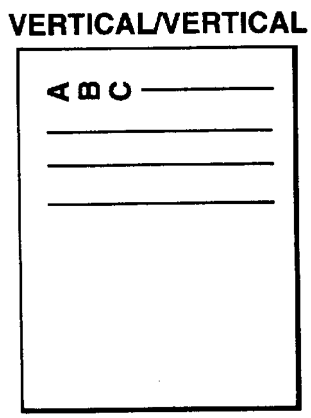
Figure 4C:
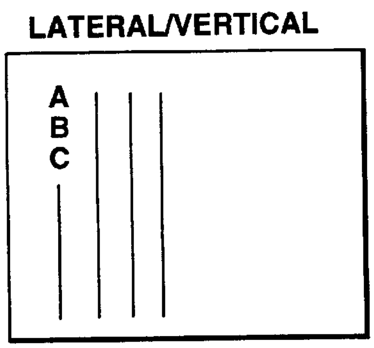
Figure 4D:
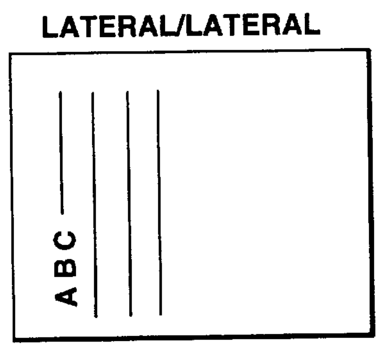

A printer 13 is composed, for example, of a thermal printer which is capable of printing on a laterally long sheet of paper having a maximum of an A4 size. When the key-in unit 8 directs the printer to print a document, the document processor 7 causes the printer 13 to print out document data in the document memory 10 in accordance with a printing format in which the format data stored in the document format memory 12 indicates. FIGS. 4(A) to 4(D) each show a one-page print image in which characters are printed on the basis of the direction of a sheet of printing paper being placed and the direction of printing as formats. FIGS. 4(A) and 4(B) show the cases in which the sheets of papers are placed so as to be long "vertically" while FIGS. 4(C) and 4(D) show the cases in which the sheets of printing paper are placed so as to be long "laterally". FIGS. 4(A) and 4(D) show the cases in which the printing direction is lateral while FIGS. 4(B) and (C) show the cases in which the printing direction is vertical. In summary, four printing forms are obtained in accordance with the formats about the direction of sheet extension and the direction of paper printing.

Figure 5:
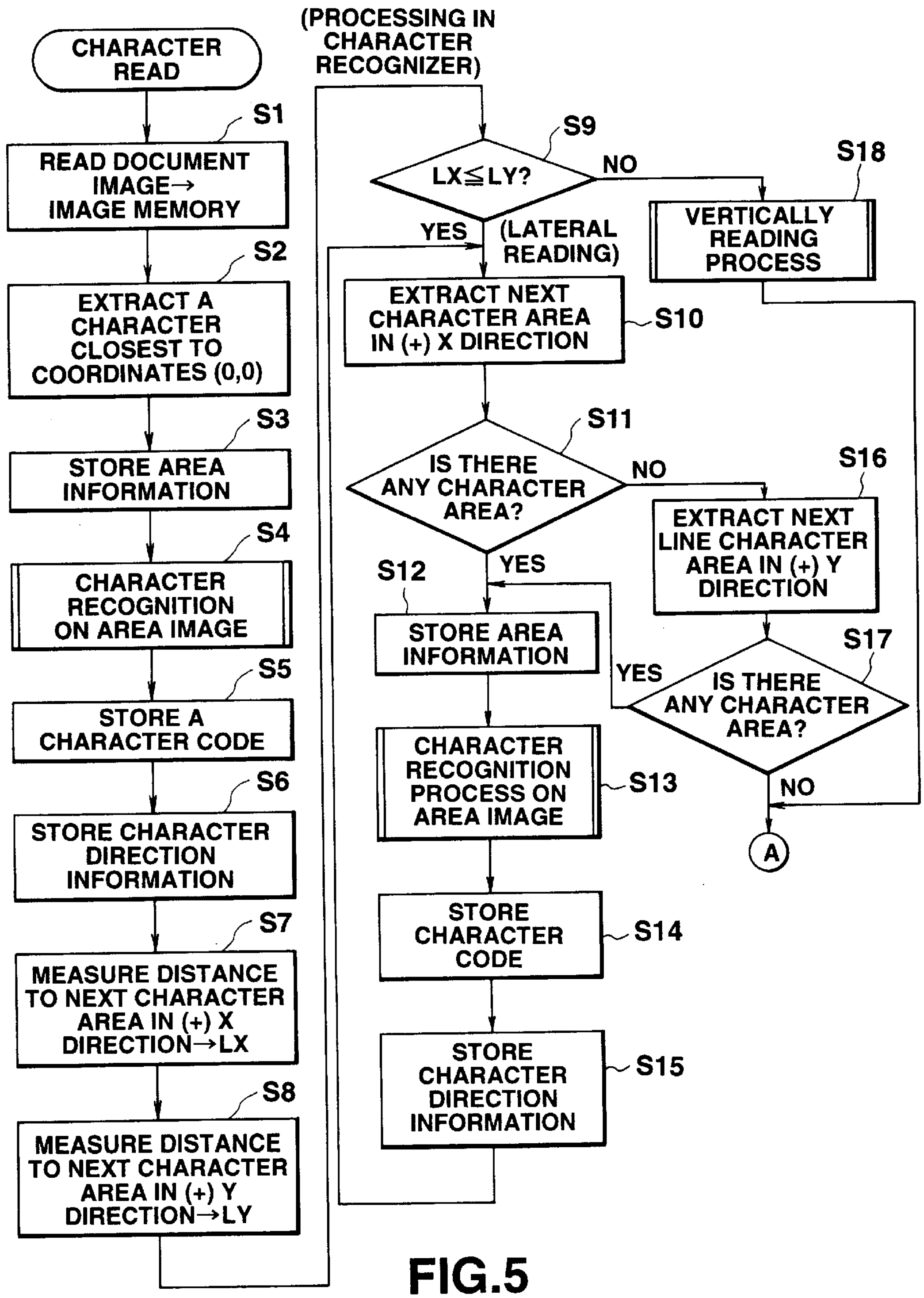
Figure 6:
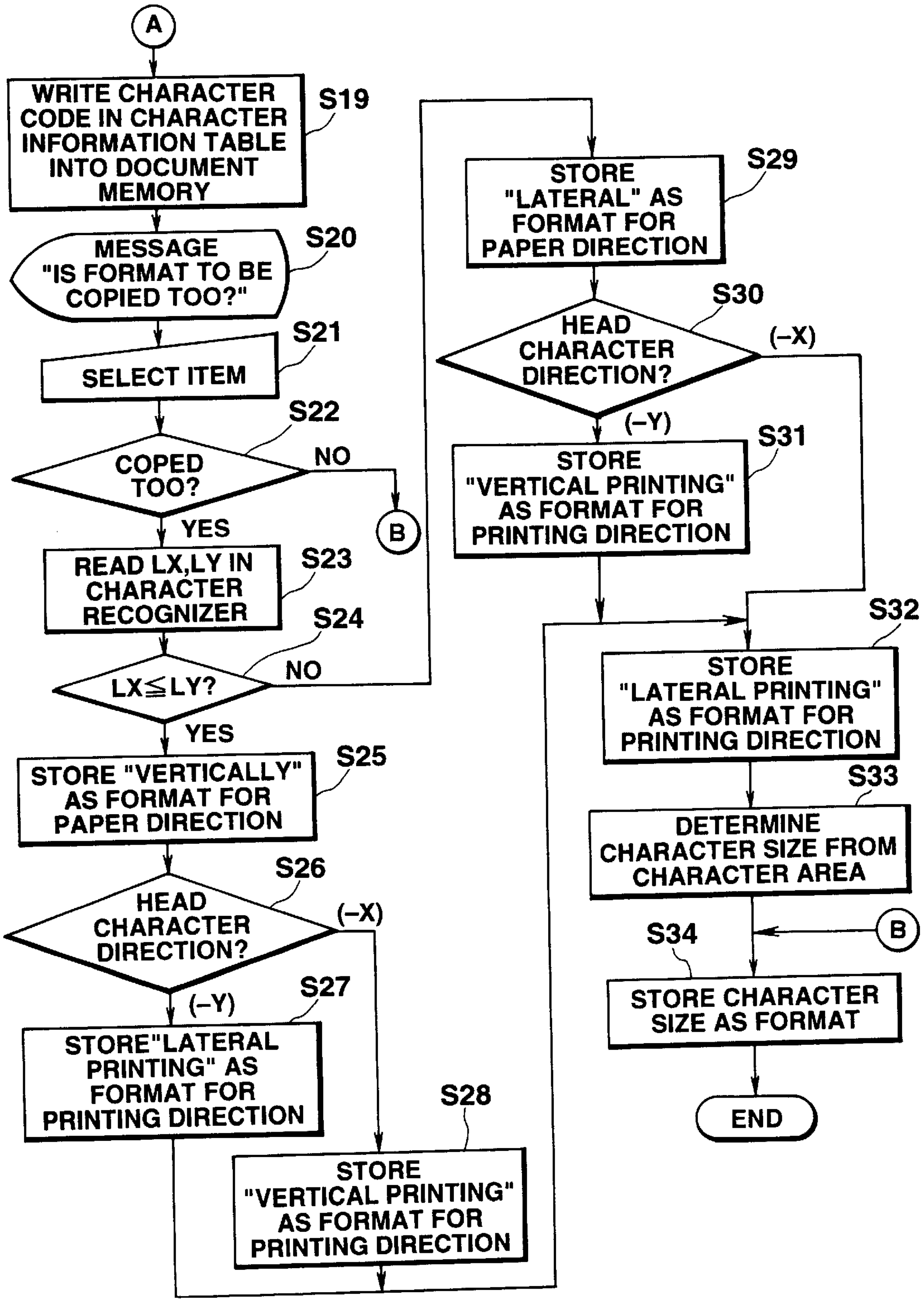

The operation of the present embodiment will be described with reference to flow charts of FIGS. 5 and 6. FIG. 5 shows a flow chart indicative of the operation algorithm of the character recognizer 2. FIG. 6 shows a flow chart indicative of the operation algorithm of the document processor 7 continuing from the flow chart of FIG. 5.

First, when an image reading command is given from the key-in unit 8, the document processor 7 starts up the character recognizer 2. When a document image is read from an original document by the image scanner 1, the character recognizer 2 accepts data on the document image and stores it in the image memory 3 (step S1). The document processor 2 extracts a character area closest to the origin which has the coordinates (0, 0) of a plane coordinate system spread on the image memory 3 (step S2), and stores area information (starting and ending coordinates) into the character information table 5 (step S3). In the example of FIG. 3, the starting coordinates ($X_0$, $Y_0$) and the ending coordinates ($X_1$, $Y_1$) of the character "A" are stored as data in the character information table 5.

The character recognizer 2 refers to the recognition dictionary memory 4 on the basis of the image data in the character area, recognizes a corresponding character and converts same to a character code (step S4), and stores the character code in the character information table 5 (step S5). In addition, the character recognizer 2 detects the direction of the character on the basis of the image data in the character area, and stores it in the character information table 5 (step S6). Thus, the content of the head record in the character information table 5 is shown, for example, in FIG. 2. When processing of the head character ends, the character recognizer measures the distance from the head character to the next character area in the X direction, and stores data on the distance as "LX" in the scale memory 6 (step S7). Similarly, the character recognizer measures the distance from the head character to the next character area in the Y direction and stores data on the distance as "LY" in the scale memory 6 (step S8).

The character recognizer 2 then reads data on "LX" and "LY" in the scale memory 6 and compares both as to whether "LX≦LY" holds (step S9). This comparison is performed to employ the larger one of the two distances as expressing the line direction. If "LX" is larger then "LY", the Y and X directions are recognized as expressing the line or row and column directions, respectively, and vice versa. Since "LY" is larger than "LX" in the example of FIG. 3, the character recognizer 2 recognizes the Y direction as the line direction and starts a lateral reading process in which the Y direction is recognized as the line direction and the content of the image memory 3 is processed sequentially in the X (lateral) direction.

That is, the character recognizer 2 scans the data in the image memory 3 in the X direction, extracts the next character area (step S10), and checks whether there is a character area or the line end has been passed over (step S11). If there is a character area, the character recognizer 2 writes information on the area at the next or second record position in the character information table 5 (step S12), performs a character recognition on image data in the character area (step S13) and stores data on a recognized character code in the character information table 5 (step S14). The character recognizer 2 then detects the direction of the character on the basis of the image data in the area and stores it in the character information table 5 (step S15). Thus, the processing of the character "B" ends in the FIG. 3 example and the character recognizer 2 stores the result of this processing at the second record position of the character information table 5 (FIG. 2). The operation of the character recognizer 2 then returns to step S10, where each time the character recognizer extracts the next character area in the X direction, it repeats the above operations.

When the processing of up to a character "D" at the end of the line ends, as shown in FIG. 3, and the character recognizer 2 detects this fact at step S11, the operation of the character recognizer 2 passes to step S16, where the recognizer 2 extracts a character area in the next line in the +Y direction and checks whether there is a character area or whether the document ends (step S17). Since the processing in the first line of FIG. 3 ends and there is a character string of "X", "Y" and "Z" in the second line in the +Y direction, the operation of the character recognizer 2 returns to step S12, where the recognizer extracts the area of the line head character and repeats processes similar to those mentioned above until the line ends.

In summary, the lateral reading process includes sequential extraction of the respective character areas of the image memory 3 and recognition of characters in the areas in the X direction. If "LX" is larger than "LY" at step S9 or the line direction is the X direction, the operation of the character recognizer shifts to the vertical reading process (step S18). This process is basically similar to the lateral reading process including the steps S10–S17 except that in the vertical reading process of this embodiment the +X direction at step S10 is replaced with the +Y direction and the +Y direction at step S16 is replaced with the +X direction. Thus, the vertical reading process includes sequential extraction of the respective character areas of the image memory 3 and recognition and encoding of the characters in the corresponding character areas in the Y direction.

In this way, when the character recognizer 2 encodes the whole document image up to its end in the image memory 3 to character codes, it determines "NO" at step S17 and starts up the document processor 7, whereupon the document processor 7 operates in accordance with the flow chart of FIG. 6. First, the document processor 7 accepts the content of the document information table 5 transferred from the document recognizer 2 and writes the respective character codes into the document memory 10 (step S19), and displays a message "Is the document format to be copied too?" (step S20). When the key-in unit 8 performs a selective operation in response to the message (step S21), the document processor 7 checks the content of the selective operation (step S22). If the content of the operation is "The document format is to be copied too", the operation of the document processor 7 shifts to a format setting process starting at step S23.

First, the document processor 7 accepts data in the scale memory 6 transferred from the character recognizer 2, stores it into the scale memory 11 on the side of the document processor 7 (step S23). The document processor 7 then compares "LX" and "LY" in the scale memory 11 to check whether "LX≦LY" holds (step S24). That is, the document processor 7 checks the line direction of the document. If the line direction is the Y direction, the control passes to step S25, where the document processor 7 stores data on "vertically" as a format for the direction of a sheet of printing paper in the document format memory 12 (step S25). The document processor 7 then checks the direction of the head character in the document information table 5 (step S26). If the direction of the character is "−Y", the document processor 7 stores data on "lateral printing" as a format for the printing direction in the document format memory 12 (step S27). If the direction of the character is "−X", the document processor 7 stores data on "vertical printing" as a format for the printing direction in the document format memory 12 (step S28).

When the document processor 7 detects at step S24 that the line direction is the X direction, the control passes to step S29, where the document processor 7 stores data on "lateral direction" as a format for the direction of the sheet of paper in the document format memory 12. The document processor then checks the direction of the head character in the document information table 5 (step S30). If it is "−Y", the document processor 7 stores data on "vertical printing" as a format for the printing direction in the document format memory 12 (step S31). If it is "−X", the document processor 7 stores data on "lateral printing" as a format for the printing direction in the document format memory 12 (step 32).

The document processor 7 then takes in the starting and ending coordinates of the respective characters in the character information table 5, determines a character size from a character area specified by the coordinate positions (step S33), and stores it as a format for the character size in the document format memory 12 (step S34).

As described above, in the first embodiment, when the character recognizer 2 recognizes and encodes a document image in the image memory 3, the document recognizer 2 measures the distance LX between the head character area and the next character area in the X direction in the image memory 3 and the distance LY between the head character area and the next character area in the Y direction, and detects the direction of the characters. Thus, the document processor 7 takes in data on the distances LX and LY, determines which of the distances LX and LY is larger to determine whether the sheet of printing paper is fed, "vertically long" or "laterally long", and stores data on the direction of the sheet of paper as a format. The document processor 7 takes in data on the direction of the character from the character recognizer 2, determines which of "lateral writing" and "vertical writing" is used depending on the direction of the character, and stores data on the result of the determination as a format for the printing direction. Since the character recognizer 2 extracts the character areas in units of a character and detects the starting and ending coordinates of each character area as area information, the document processor 7 determines a character size on the basis of the area information and stores it as a format.

While in the first embodiment the direction of a sheet of printing paper, the printing direction and the character size are set as format information by analyzing the document structure of the document image, place and line intervals may be set as formats. In this case, since the distances "LX" and "LY" are expressed in a unit of dot, they may be converted so as to be expressed in each line and place to obtain the place and line intervals and store same as format information.

When "LX" and "LY" are calculated, the head character is used as a reference in the embodiment, any character can be used as a reference so long as there are characters next to the reference character in the X and Y directions.

Second Embodiment

Figure 7:
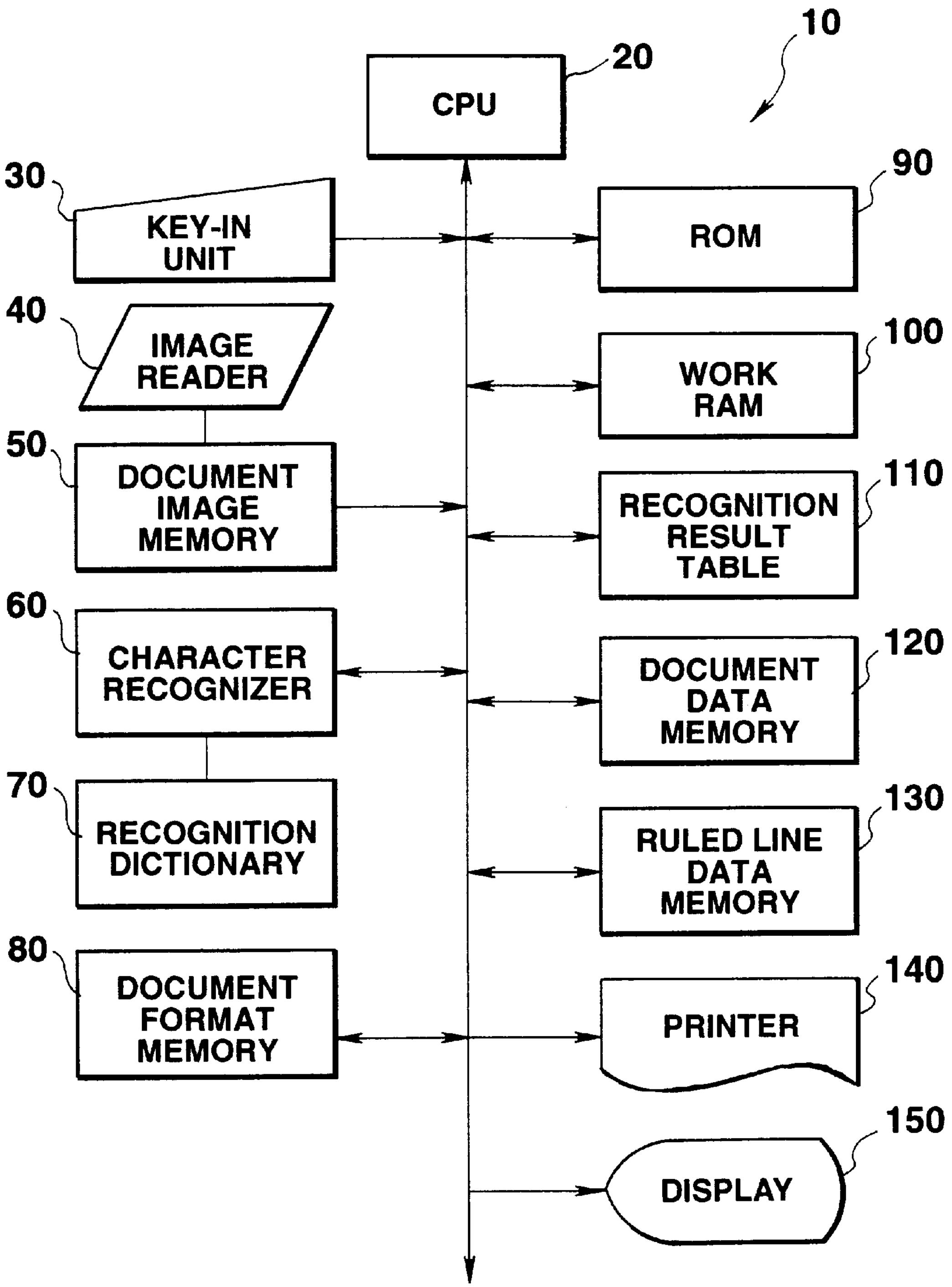

Referring to FIGS. 7–25, a second embodiment of the inventive document image processor will be described in detail. FIG. 7 is a block diagram of the document image processor 10. In FIG. 7, the structure of the document image processor 10 will be described. It includes a CPU (Central Processing Unit) 20, key-in unit 30, image reader 40, original document image memory 50, character recognizer 60, recognition dictionary 70, document format memory 80, ROM (Read Only Memory) 90, work RAM (Random Access Memory) 100, recognition result table 110, document data memory 120, ruled line data memory 130, printer 140 and display 150.

The CPU 20 controls the respective elements of the document image processor 10 in accordance with various control programs stored in the ROM 90, performs various document data processes, and displays the stages and result of the processing on the display 150.

The CPU 20 performs a document reading process in accordance with a document reading program to be described later in more detail and performs character recognition, line position calculation in each line, character size calculation in each line, line position correction, stored character size calculation, stored character size correction, place position calculation, ruled-line storage position calculation, and document data creation on the document image data read and stored by the image reader 50 into the document image memory 50, and automatically sets a format corresponding to the read document image.

The key-in unit 30 includes a cursor key, numeral input keys, character input keys and function keys and outputs a signal indicative of a depressed key to the CPU 20.

The image reader 40 causes its line image sensor to scan a display screen, to be read, at a predetermined speed to read an image for each line and outputs image data to the original document image memory 50, which has a memory area in which image data on the read document input from the image reader 40 is stored.

The character recognizer 60 recognizes a character extracted from the original document image data stored in the original document image memory 50, selects a character code corresponding to the recognized character from the recognition dictionary 70, recognizes character position information and new line information for each character code in each line on the original document image, and stores the information in the recognition result table 110.

The recognition dictionary 70 contains character code data and is used when a character recognition process is performed by the character recognizer 60.

The document format memory 80 stores document format data corresponding to the respective document data stored in the document data memory 120. More specifically, the document format memory 80 stores data on the average line interval, average place interval between adjacent characters, left and top margin dot counts calculated by the CPU 20 in the document reading process.

The ROM 90 contains various control programs, document reading program, and as will be described later, line information table creating program, line position correcting program, character magnification calculating program, character magnification correcting program, place position calculating program and ruled-line value calculating program, executed by the CPU 20.

The work RAM 100 has a memory area in which various data is spread when the CPU 20 executes the respective processing programs. The recognition result table 110 stores a character code recognized in the character recognition process executed by the character recognizer 60, and character position information and new line information in a line corresponding to the character code.

The document data memory 120 stores data on characters on the document image for which the setting of the character recognition and document format has ended. The ruled line data memory 130 stores ruled-line position information obtained in the ruled-line storage position calculating process performed by the CPU 20. The printer 140 prints out document data stored in the document data memory 120 on a predetermined sheet of paper in accordance with the document format, data on which is stored in the document format memory 80, under control of the CPU 20. The display 150 displays the stages and results of processing the various document data performed by the CPU 20.

The operation of the second embodiment will then be described. First, the document reading process performed by the CPU 20 will be described with reference to the flow charts of FIGS. 8 and 9. When the image reader 40 reads one page of the original document (step A1), the CPU 20 stores the read image data for that page in the document image memory 50 (step A2). The CPU 20 extracts one character area from the stored document image data (step A3). The CPU 20 causes the character recognizer 60 to perform a character recognition process for a character in the extracted one-character area (step A4).

Figure 10:
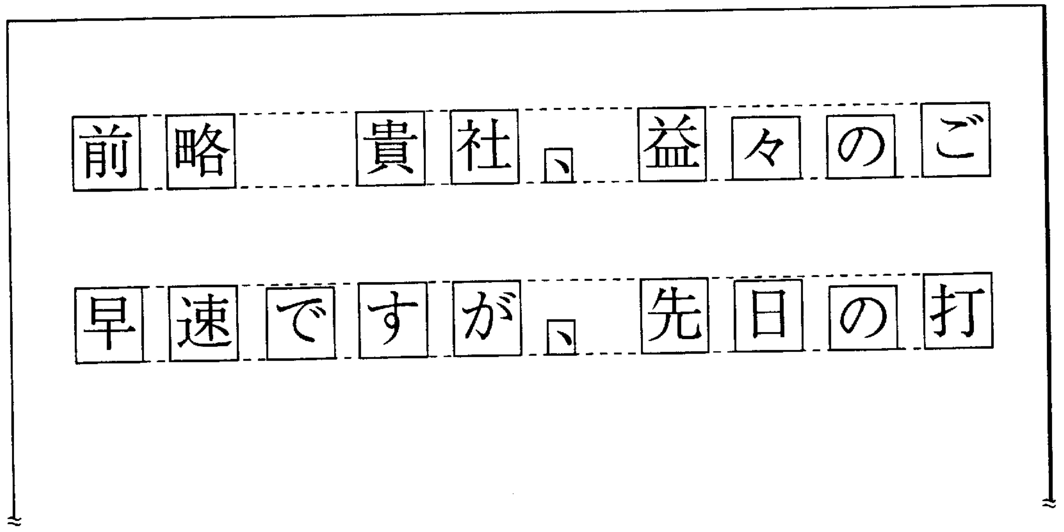

More particularly, as shown in FIG. 10, the character recognizer 10 performs a character recognition process for each character on the document image and selects the corresponding character code from the recognition dictionary 70.

As shown in FIG. 11, the character recognizer 60 then stores the recognized character code and its area information (top left coordinates (x, y) and bottom right coordinates (x, y) indicative of the positions of the characters on the document image) as character position information having a data structure of a unit of 2 bytes on the recognition result table 110, (step A5). The character recognizer 60 repeats this character recognition process for each character for one line to successively store character position information on the recognition result table 110 (steps A3–A6). When the character recognizer 10 finds a new line, it stores new line start information and new line position information in a data structure of FIG. 11 [new line, top left coordinates (x, y) and bottom right coordinates (x, y)] on the recognition result table 110 (step A7).

The character recognizer 60 then determines whether the recognition of characters of all the lines has ended (step A8). If not, the character recognizer 60 then indicates the next line (step A9), repeats the processing at steps A3–A7 to perform the character recognition process on all the lines, and stores on the recognition result table 110 the character codes, their area information, new line information and new line position information for all the lines, as shown in FIG. 11.

Figure 12:
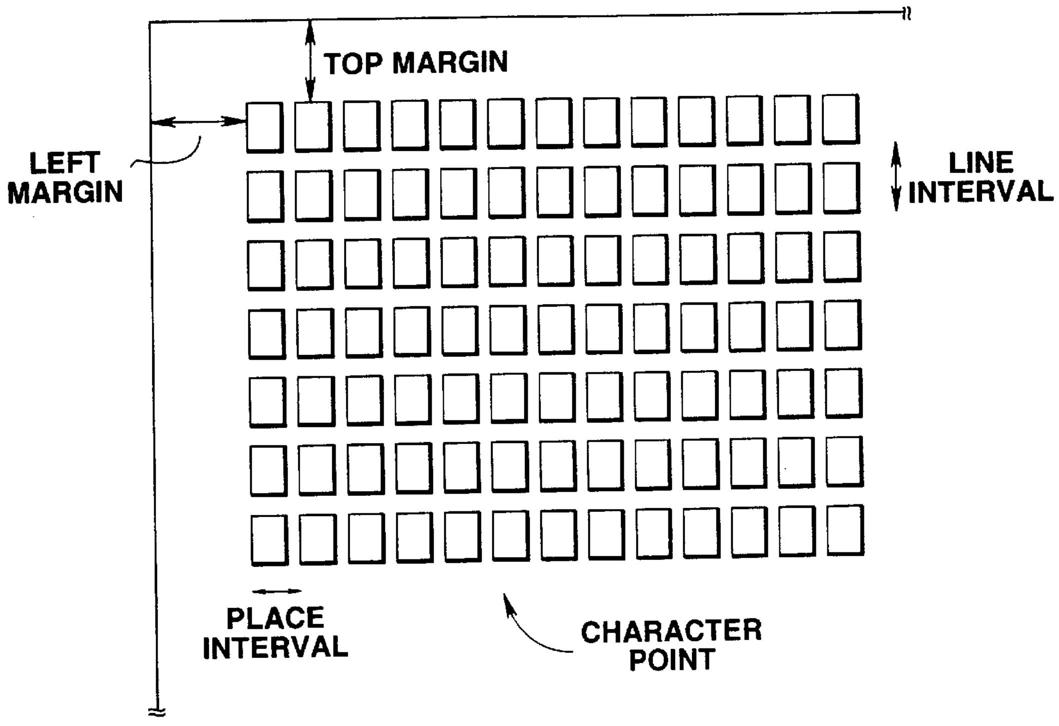

When the character recognition on all the lines has ended, the CPU 20 calculates an average line interval as document format information necessary for setting a document format on the document image of FIG. 12 from all dot counts each indicative of the interval or spacing between two sequentially adjacent ones of all the lines in the Y direction on the document image (step A10), and calculates an average place interval from dot counts each between two sequentially adjacent ones of all the character places in the X direction on the document image (step A11). The CPU 20 then calculates a left margin and a top margin from dot counts in the X and Y directions on the document image (step A12), and stores data on those average line and place intervals, and left and top margins in the document format memory 80 (step A13).

Figure 13:
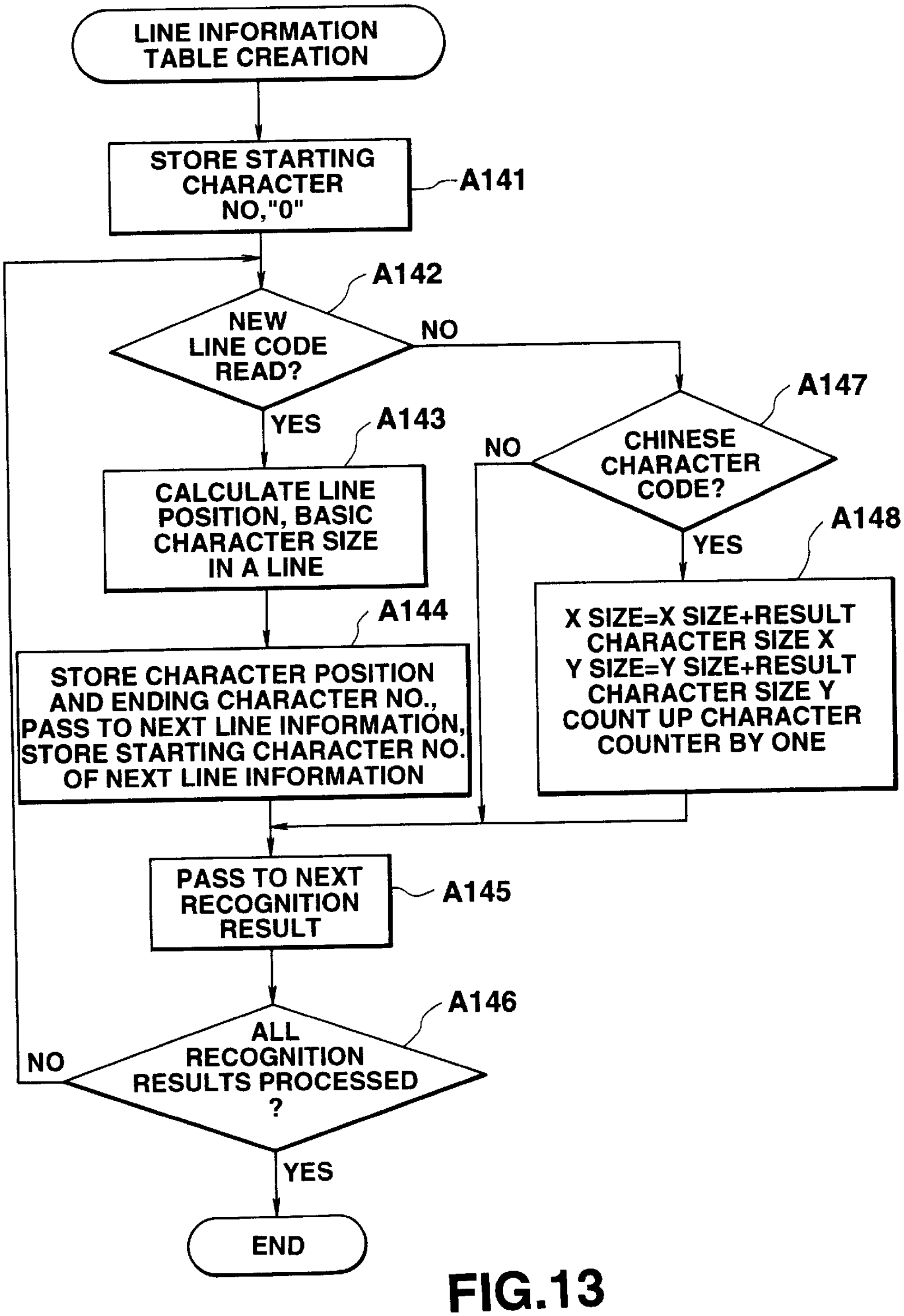

The CPU 20 then performs a line information table creation process at step A14, which will be described next with reference to the flow chart of FIG. 13. In FIG. 13, the CPU first reads data on a starting (0th) character number of a first line stored in the recognition result table 110, sets character size data as (x size→0, y size→0) in units of 2 bytes on the line information table as shown in FIG. 14 (step A141), and determines whether the read data is a new line code (step A142).

If so, the CPU 20 calculates the position of the line on the basis of the new line information. The new line position information is stored as a dot position (coordinates) from the top left to the bottom right of the recognized line in the recognition result table 110. Thus, its line position is calculated on the basis of the midpoint of the line in the y axis direction. More specifically, let the top left and bottom right coordinates be (x0, y0) and (x1, y1), respectively, of the new line. In this case, the line position is calculated from the next expression (1):

$$\text{The line position}=[(y0+y1)/2-\text{top margin dot count}]/\text{line interval dot count} \quad (1)$$

The basis character size in a line is obtained by dividing the respective sums of the x and y sizes of all the characters in the line obtained at step A148 to be described later in more detail by the character count in the line (step A143).

The CPU 20 then stores the calculated line position, basic character size, character line position and end character number of the line in the line information table, as shown in FIG. 14. The control then passes to the next line information processing. The CPU 20 then reads the starting character number (0) and other data on that line from the recognition result table 110 and stores them in the line information table (steps A144, A145), repeats the processing at steps A142–A145 on the result of recognition for all the lines in the recognition result table, and confirms the end of the processing of the recognition result for all the lines (step A146) to thereby end this process.

When the read data is not on a new line code, but a character code at step A142, the CPU 20 confirms whether the character code is a Chinese character code (step A147). If not, the control passes to step A145. If the character code is a Chinese one, the CPU calculates the x and y sizes of the character by adding the current x and y sizes to corresponding result character sizes x and y (which include the results of addition of the x and y sizes of up to the preceding characters) and counts up the character counter by one (step A148). The control then passes to step A145.

By the above processes, the creation of the line information table of FIG. 14 which is composed of information on the respective lines on the read document image ends. Data on coordinates (x0, y0) and (x1, y1) of FIG. 14 is obtained by reading and storing the top left coordinates (x, y) and bottom right coordinates (x, y) stored as new line position information in the recognition result table.

When a recognized character image covers two adjacent format lines in a document format in the conventional original document image recognition process, a line where a character string is continuous in the document may be laid out in two lines. In this case, the recognized image would be greatly different from the original image as well as a later change of the layout in the document would be difficult. In contrast, in the line information table creation process in the second embodiment of the present invention, a line position, data on which is stored by regarding a one recognized line as continuous, is calculated. Thus, the situation in which a character string on one line is recognized as composed of two lines and laid out so is avoided.

Conventionally, when a character size is determined from the character image on the read document image, even some of a font having the same point number can be calculated in a half size depending on the form (a Chinese character, Kana character, punctuation mark, etc.) of the font, as shown in FIG. 10, so that the resulting document would have character sizes which are quite different from those of the original document image. In contrast, in the line basic character size determination process of the line information table creation process of the present embodiment, the character size is obtained by dividing the respective sums of the x and y sizes of all characters in the line by the character count in the line, so that the sizes of characters in the line are the same. Thus, a document image close to the original document image is obtained.

Figure 8:
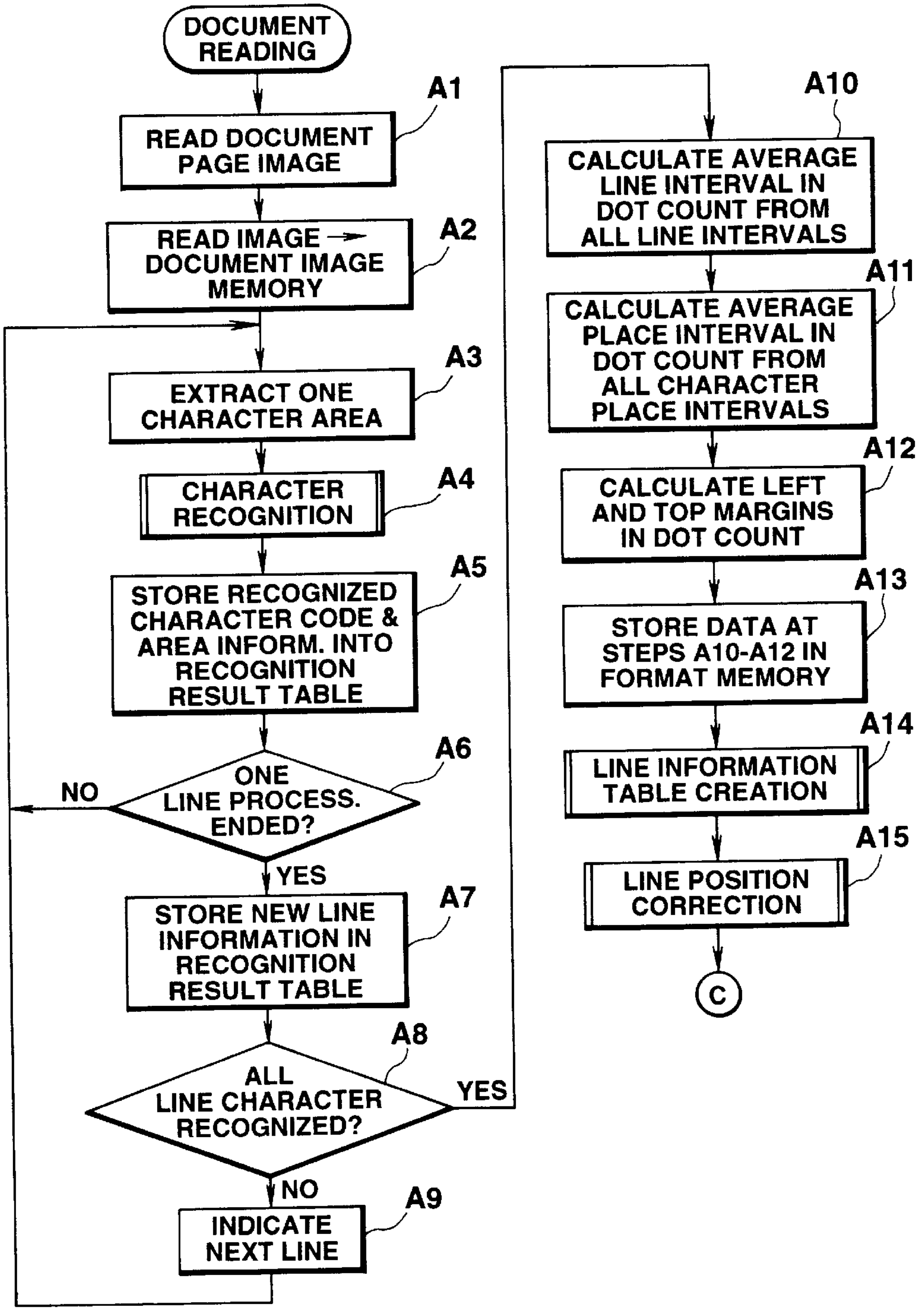
Figure 15:
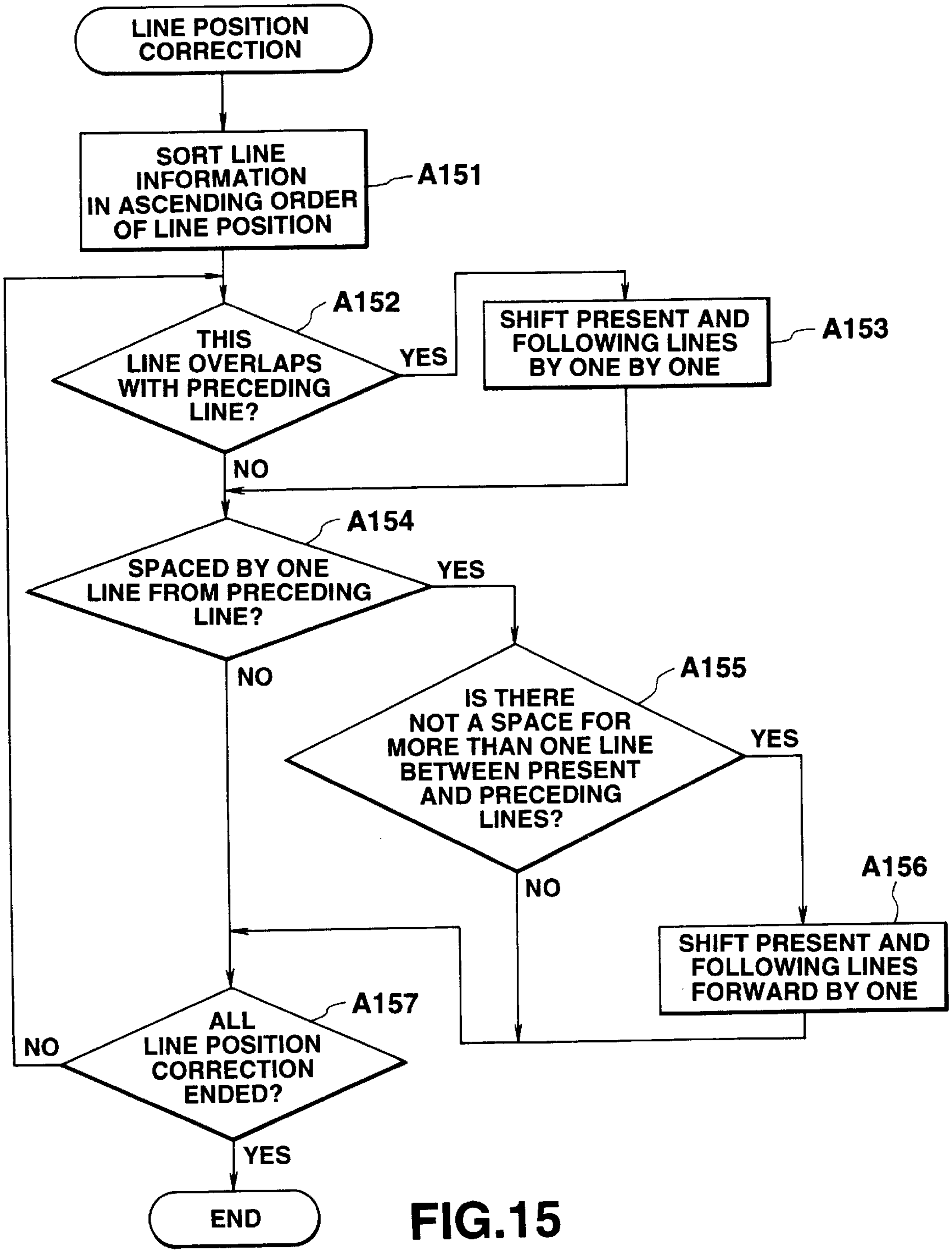

The control returns to step A15 of FIG. 8, where the CPU performs the line position correction process, which will be described with reference to a flow chart of FIG. 15. In FIG. 15, first, the CPU 20 sorts line information stored in the line information table in an ascending order of line position (step A151). The CPU 20 then refers to data on y coordinates indicative of the positions of the respective lines (preceding line coordinate y1 and present line coordinate y0), and checks whether the position of the present line overlaps with that of the preceding line (step A152). If so, the CPU 20 rewrites information on the respective present and following line positions stored in the line information table such that their line positions are shifted one by one backward (step A153).

If there is no line overlapping in position with the preceding line, or after the processing at step A153, the CPU 20 refers to coordinate data on the position of the respective lines and checks whether there is a line spaced by one line from the preceding line, in a manner similar to that described above (step A154). If so, the CPU 20 checks on the basis of the dot count concerned on the document image whether there is not a space for more than one line between the present line and the preceding line (step A155). If not, the CPU 20 determines that the present line is not a blank line provided consciously and rewrites information on the respective appropriate line positions stored in the line information table such that the positions of the lines which include the present and following lines are shifted forward one by one (step A156).

When there is no one line space between the present line and the preceding line at step A154 or when there is a spacing for one line between the present line and the preceding line and there is a spacing for more than one line, the CPU determines that the present line is so provided consciously, and rewrites no line position information. Thus, the control returns through step A157 to step A152, where the CPU 20 repeatedly performs the position correction process for the next line. The CPU 20 then confirms at step A157 that the line position correction process for all the lines has ended, and ends the present line position correction process.

By the line position correction process, thus performed, correction to the positions of all the lines on the original document image ends and the line information table of FIG. 14 is completed.

Thus, by performing the line position correction process in this embodiment, the positions of overlapping lines and of two adjacent lines, the spacing between which is for more than one line, are corrected so as to provide a document having an image close to that of the original document.

Figure 9:
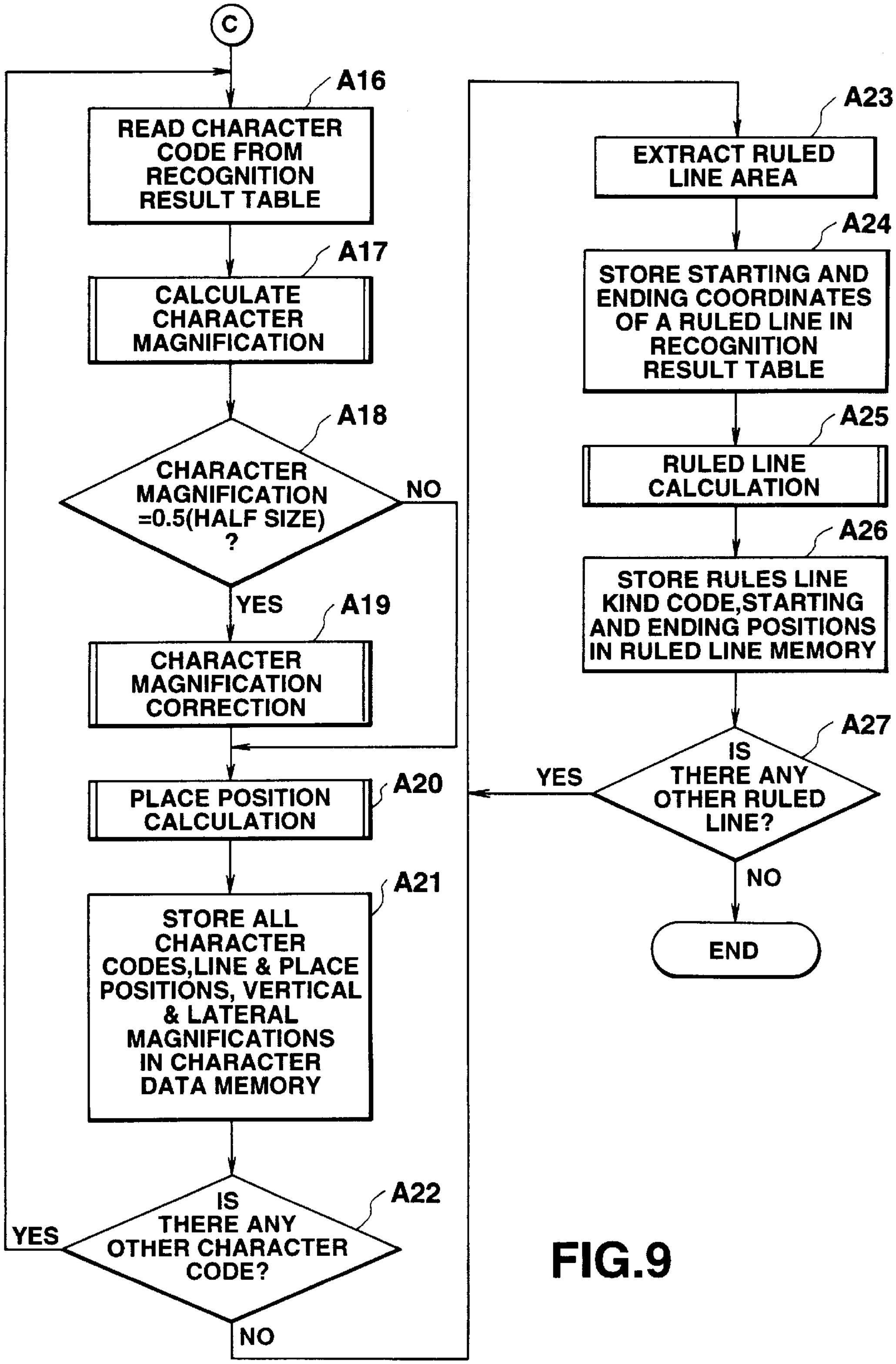

Then, the control returns again to step A16 of FIG. 9, where the CPU 20 reads a character code for one character from the recognition result table 110, and calculates the magnification of its character (step A17). This character magnification calculation process will be described next with reference to a flow chart of FIG. 16. In the present process, the magnification of the size of each character to be actually stored is calculated with reference to a basic character size in each line. When the calculation expression by which the basic character size is calculated is applied to all the characters, the lateral magnification of the character size would be small for a vertically long character font whereas the vertical magnification of a character size would be small for a laterally long character font. In addition, both the vertical and lateral magnifications of a character size would be small for a character font small vertically and laterally.

In the second embodiment, the shapes of fonts are classified into four kinds; that is, vertically long, laterally long, slightly small, and square. A character magnification is set depending on each of the kinds of font shapes to set a correct character size. Several kinds of character fonts which classify the font shapes will be shown next:

| | |
|---|---|
| Vertically long | : ; () { } [ ] 1 I i J l |
| Laterally long | - ~ . . . – = |
| Slightly small | , ○ · , . ' " |
| Square | hiragana characters, katakana characters other than the above hiragana characters, katakana characters, alphabets, numerals and Chinese characters (except for special ones such as , ) |

Figure 16:
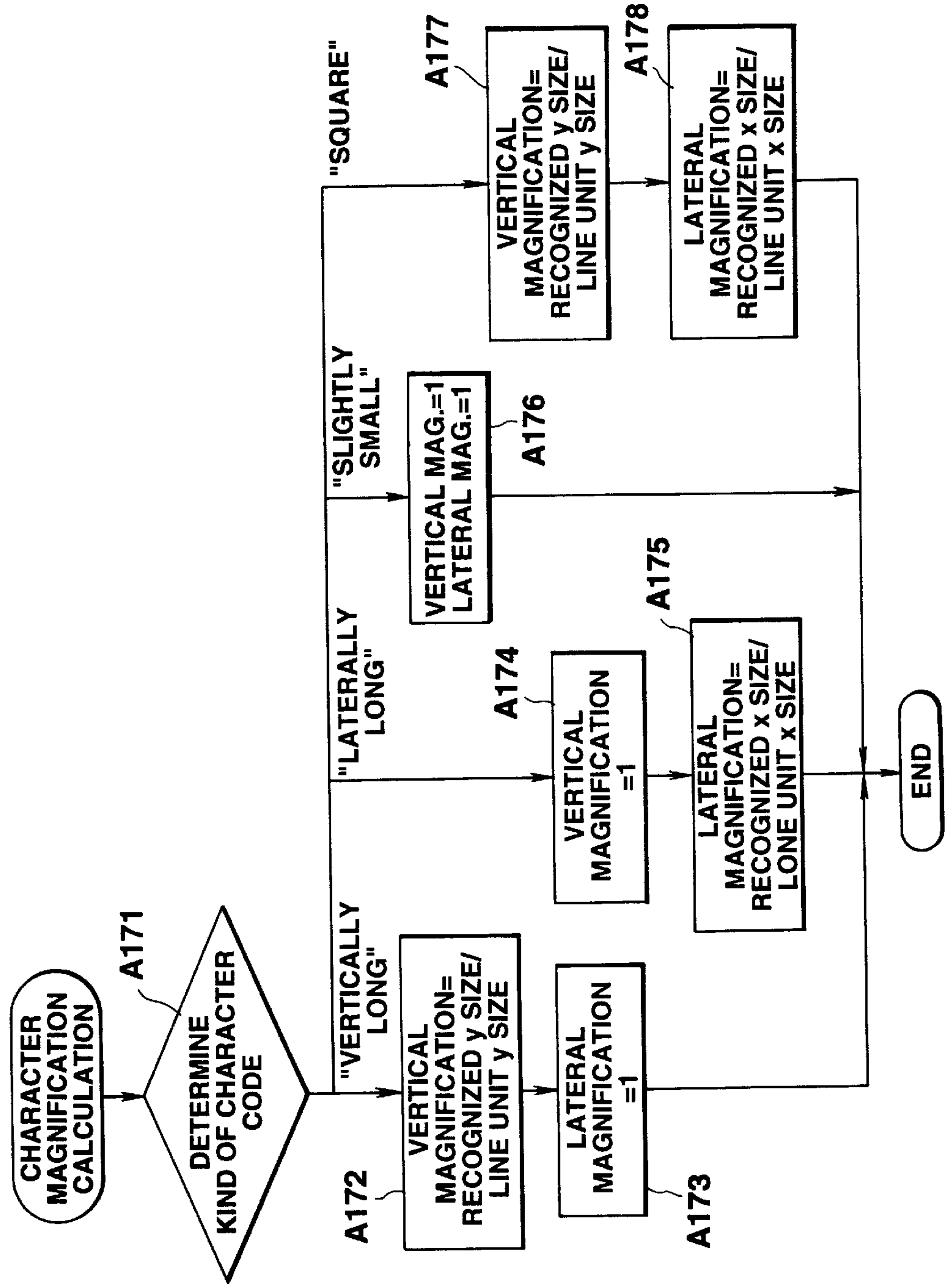

In FIG. 16, the CPU 20 first determines the kind of that character code (step A171), that is, whether the shape of that character is "vertically long", "laterally long", "slightly small" or "square". In the case of a vertically long character font, its vertical magnification is calculated by dividing a recognized y size stored in the recognition result table of FIG. 11 by a line unit y size stored in the line information table of FIG. 14 (step A172), and sets the lateral magnification at 1 (step A173) to thereby end the setting of the character magnification of the vertically long character font.

In the case of a laterally long character font, its vertical magnification is set at 1 (step A174), the lateral magnification is calculated by dividing the recognized x size stored in the recognition result table of FIG. 11 by the line unit x size stored in the line information table of FIG. 14 (step A175) to thereby end the setting of the character magnification of the laterally long character font.

In the case of a slightly small character font, the vertical and lateral magnifications are both set at 1 (step A176). In the case of a square character font, its vertical magnification is calculated by dividing the recognized y size stored in the recognition result table of FIG. 11 by the line unit y size stored in the line information table of FIG. 14 (step A177). The lateral magnification of the square character font is calculated by dividing the recognized x size stored in the recognition result table of FIG. 11 by the line unit x size stored in the line information table of FIG. 14 (step A178) to thereby end the setting of the character magnifications of the slightly small and square character fonts.

The character magnifications, calculated as described above, conform to the shapes of the recognized character fonts and the setting of a character magnification which does not correspond to the character size of the original document is avoided.

At step A18 of FIG. 9, the CPU 20 checks whether the magnification of each character calculated in the character magnification calculation process is 0.5 and extracts a character set in a half size by the calculation of the character magnifications. The character magnification correction process is then performed at step A19.

This character magnification correction process will be described next with reference to the flow chart of FIG. 17. The present process includes correction to the magnification of a character font having a half size calculated from a corresponding square character font having a full size in the character magnification calculation process. The size of a character font can be created slightly smaller than its full size depending on a maker. For example, "" and "" vary considerably in lateral size depending on the kind of font thereof.

When there is a character having a lateral magnification of a half size, the present process includes calculation of a dot count between two characters between which the appropriate character of a half size is to be inserted by correction, and correction to the magnification of the appropriate character so that the appropriate character may be inserted between the two characters.

Figure 17:
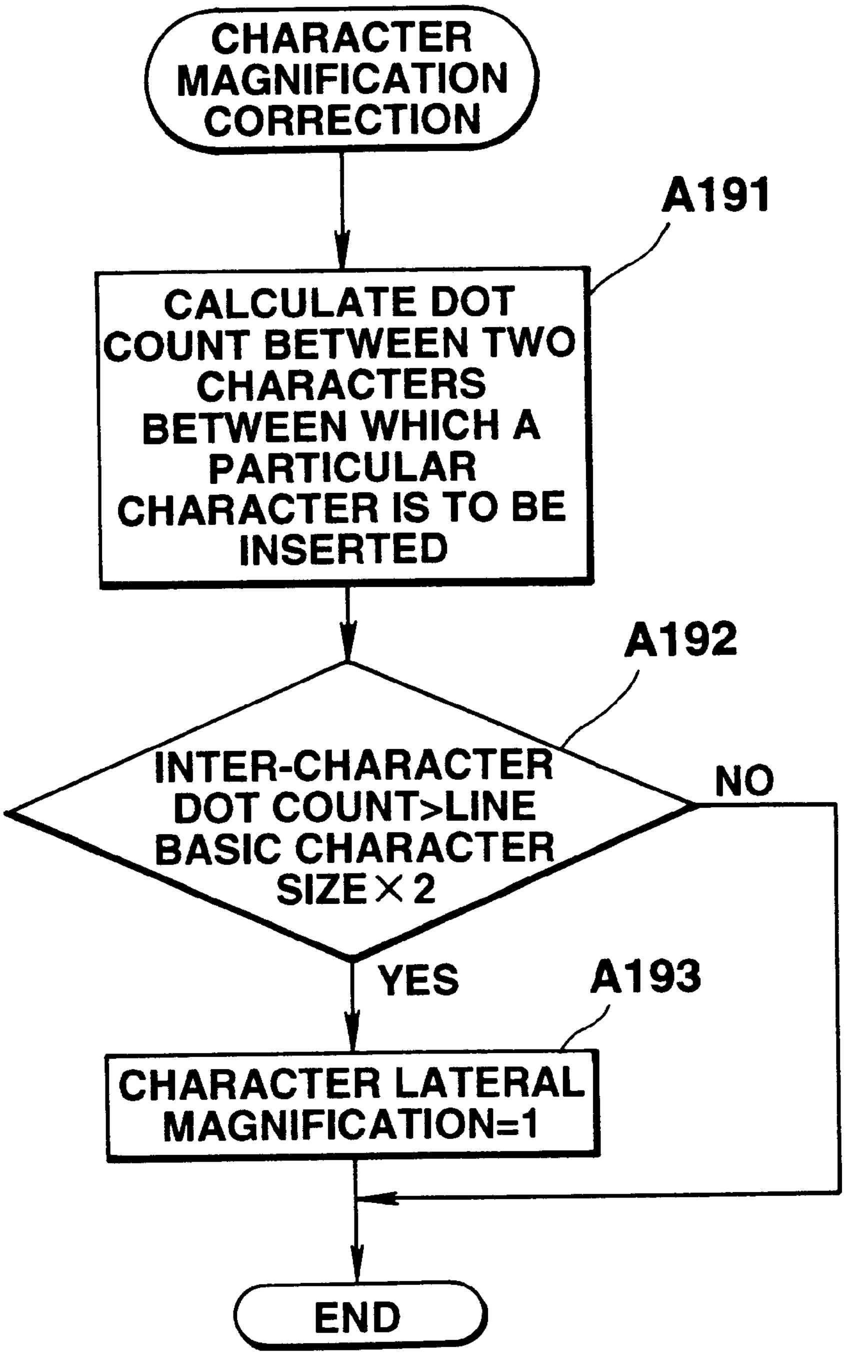
Figure 18:
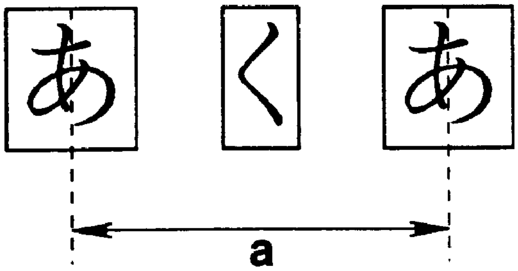

In FIG. 17, a dot count a between two characters between which a character " " set in a half size is to be inserted is calculated, as shown in FIG. 18 (step A191), and the distance between the centers of the two characters is calculated. The CPU 20 then determines whether the inter-character dot count a is larger than twice the line basic character size calculated in the line information table creation process (step A192). If so, the CPU 20 determines that the character set in the half size was originally a full size character. The lateral magnification of that character is corrected so as to be 1 (step A193) to thereby end the present process.

If the dot count between the two characters is not more than twice the line basic character size, the CPU 20 determines that the character is not of a full size, but originally of a half size. Thus, the CPU 20 does not the lateral magnification and ends the present process.

As described above, by performing the character magnification correction process, a character of a full size calculated as a half size character can be returned to a character of the original full size. A character of an original half size can hold a character image of that half size.

A place position calculation process is then performed at step A20 of FIG. 9. This process will be described next with reference to a flow chart of FIG. 19. In the present process, as in the line position calculation process above described, when the CPU 20 recognizes that the place position of a character in a document image is between two adjacent format places, the CPU determines whether the recognized character is successive to its preceding character and calculates the place position of the recognized character such that there is no blank between the format place positions and that the resulting image is not greatly different from the original document image.

Figure 20:
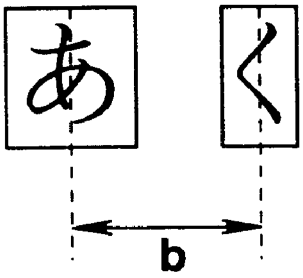
Figure 19:
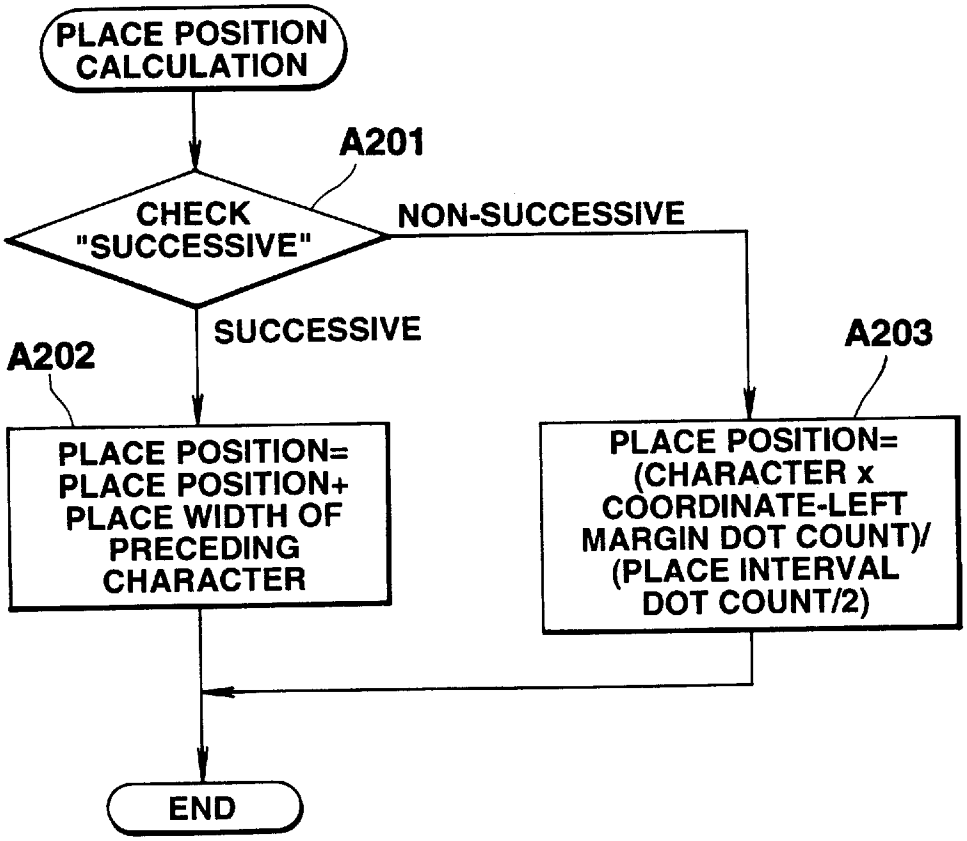

As shown in FIG. 20, the distance b between the appropriate character whose place position is to be calculated at present and the preceding character is calculated in FIG. 19. The CPU then determines whether the distance b is greater than the x size of the basic character in its line to thereby determine its successiveness (step A201). If not, the CPU determines the successiveness. Thus, the CPU calculates the place position of the appropriate character by adding the place position of the preceding character to the place width of the preceding character (in the case of a full size, 2 places; in the case of a half size, 1 place, in this example) (step A202). If so at step A201, the CPU determines non-successiveness. Thus, the CPU calculates the place position of the appropriate character from the following expression (2) (step A203).

$$\text{Place position}=(\text{character x coordinate}-\text{left margin dot count})/(\text{place interval dot count}/2) \quad (2)$$

By the above place position calculation process, there is no inadvertent blank between adjacent characters. A character before which there is an actual blank can be stored at the same position as the corresponding character position in the original document image.

Then, the control returns to step A21 of FIG. 9, where the CPU 20 then stores data on the code, line position, place position, vertical magnification, and lateral magnification of the character for which the processing at steps A17–A20 has ended in two bytes in the character data memory of FIG. 21. Thus, the CPU 20 iterates the processing at steps A16–A21 on all the character data stored in the recognition result table 110 in units of one character until the remaining character codes disappear and all the character data in the read document image is stored in the character data memory (step A22).

Figures 22, 23:
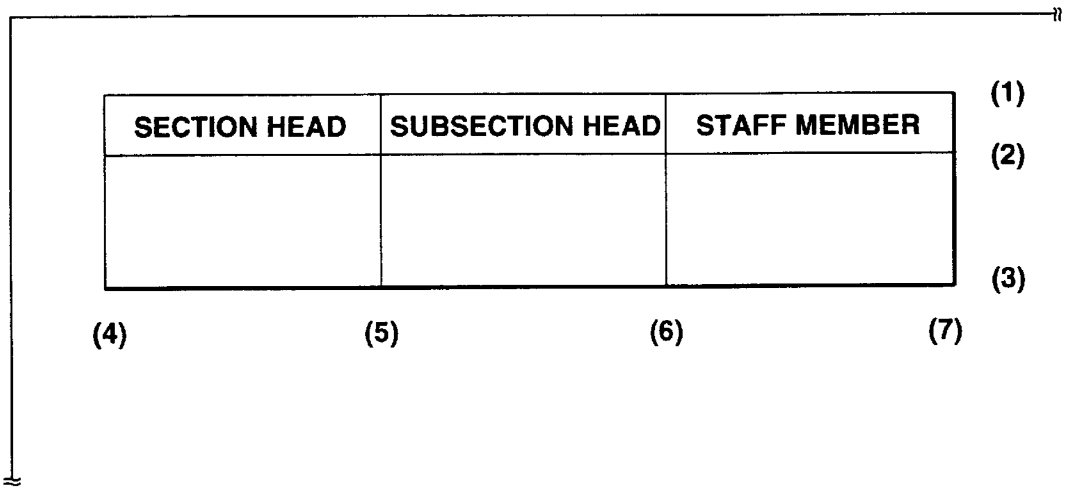

When the CPU then determines at step A22 that there are no other remaining character codes, the CPU extracts data on a ruled line area from the read document image data (step A23), and stores data on the starting and ending coordinates of the extracted ruled line in 2 bytes as ruled-line position information in the recognition result table 110, as shown in FIG. 22 (step A24). The CPU then performs a ruled-line position calculation process at step A25. This ruled line calculation process includes calculation of the distance between an already calculated line on which information appears and a target ruled line to be obtained at present and closeset to the calculated line, and the distance between the target ruled line and a second ruled line present directly above the target ruled line, comparison of the two distances, calculation of the position of the target ruled line relative to the position of that of the closest line and the second ruled line which involves a shorter one of the two distances to thereby ensure the positional relationship between the ruled lines and the related characters and reproduce the original document image.

For example, the positions of lateral ruled lines (1) and (2) on a document image of FIG. 23 can be calculated as a distance from a virtual lateral line on which information "Section head", "Subsection head", and "Staff member" appears, and the position of a lateral ruled line (3) can be calculated as a distance from the lateral ruled line (2).

Figure 24:
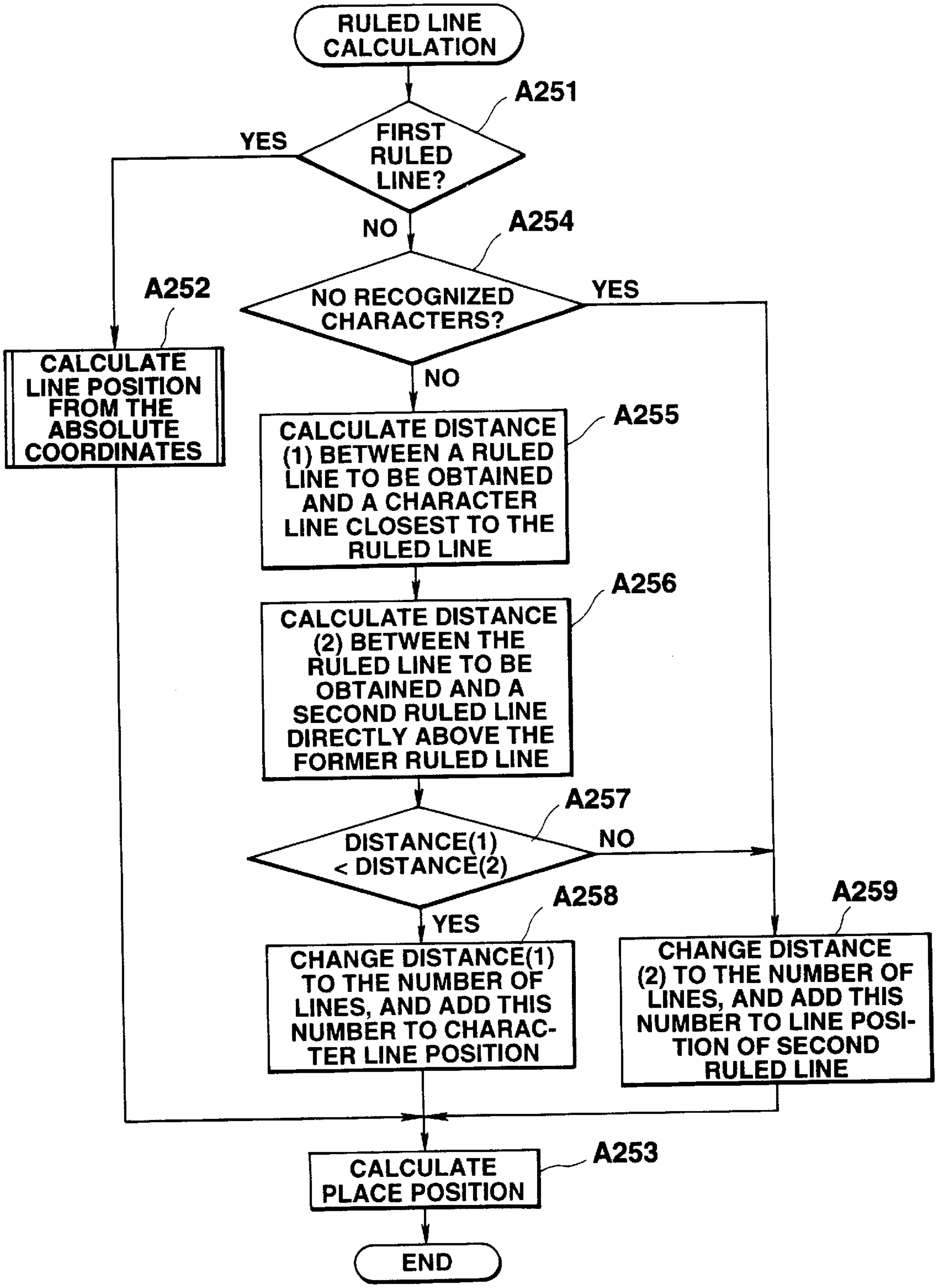

The ruled line calculation process will be described with reference to a flow chart of FIG. 24. In FIG. 24, the CPU 20 first determines whether the ruled line recognized on the basis of ruled line position information stored in the recognition result table 110 is a first one (step A251). If so, the CPU calculates a line position from the absolute coordinates of the origin on a document image, that is, by dividing the coordinate y of the appropriate ruled line relative to the left-top origin coordinates of the document by a line interval dot count (step A252) and calculates the place position of the ruled line by dividing its absolute coordinate x on the document by a place interval dot count (place=coordinate x/place interval dot count) (step A253) to thereby end the present process.

When the answer is no at step A251, the CPU determines whether there are no recognized characters (step A254), that is, whether only ruled lines are present on the document image. If there are ruled lines as well as recognized characters, the CPU calculates the distance between a target ruled line to be obtained at present and a character line closest to the target ruled line (step A255), and the distance between the target ruled line and a second ruled line present directly above the target ruled line (step A256). When the distance between the target ruled line and the character line is smaller than the distance between the target ruled line and the second ruled line directly above the target ruled line (step A257), the former distance is changed to the number of lines, the value of an integer expressing the number of lines is added to the position of the character line above the target ruled line to calculate the position of the target ruled line (step A258).

A calculation expression to change the distance to the number of lines at step A258 is shown next:

Line=distance (dot count)/line interval (dot count)

The CPU 20 calculates the place position of the ruled line from the absolute coordinates of the origin on the document (step A253) and ends the present process.

When there are no recognized characters at step A254, or when the distance between the target ruled line and the character line is larger than the distance between the target ruled line and a second ruled line directly above the target ruled line at step A257, the CPU changes the distance between the target ruled line and the second ruled line to the number of lines (the number of lines=distance (dot count)/line interval (dot count)). The CPU then adds the value of an integer expressing the number of lines to the line position of the second ruled line to calculate the position of the target ruled line (step A259). The CPU then calculates the place position of the appropriate ruled line from the absolute coordinates of the origin in the document (step A253) and ends the present process.

By performing the above ruled line calculation process for both of the vertical and lateral ruled lines of FIG. 23, that is, by calculating the position of a lateral ruled line relative to the positions of the lateral ruled lines (1), (2), (3) and then the position of a vertical ruled line relative to the positions of vertical ruled lines (4), (5), (6), (7), the positions of ruled lines conforming to the original document image are obtained.

The control then returns to step A26 of FIG. 9, where the CPU 20 stores information on the ruled line positions on the document calculated in the ruled line position calculation process as codes indicative of the kinds of ruled lines, "lateral ruled line", "starting line", "starting place", and "ending line", "ending place" in the ruled line data memory, as shown in FIG. 25. At step A27 the CPU checks whether there are any other ruled lines. If so, the CPU repeats the processing at steps A23-A27, stores information on the appropriate ruled line positions in the ruled line data memory 130 and ends the document reading process of FIGS. 8 and 9.

As described above, in the document reading process performed in the second embodiment, the process for determination of the position of each recognized character in each line is performed to calculate the position of that character in the recognized line, so that the line positions are calculated for the respective recognized data on characters in the appropriate line position is stored in the same line. Thus, a character line between two adjacent format lines is not expressed in two lines, but the characters on the character line are stored on the same line.

The basic size of each recognized character is determined or calculated in each line, and all the characters in that line are set so as to have the same full or half size. Thus, a document image close to the original one is restored and hence an easily readable document is provided.

By manipulating thresholds for the full or half size when the basic character size is calculated, an emphasized line having a character size slightly larger than the actual character is expressed in a document reproduced by reading a line emphasized (slightly large) compared to the text of the original document in the original document image to thereby emphasize those characters visually for the user.

By classifying the shapes of the character fonts into four forms: vertically long, laterally long, slightly small and square in the character size calculation process and setting a character size for each character shape, the respective vertically long, laterally long, and slightly small character fonts are prevented from reducing greatly in size compared to other characters in the same line to thereby restore a correct character string.

By calculating the distance between the centers of two adjacent characters and the size of any particular character to intervene between those characters in the character size correcting process, the character sizes each of which may change depending on the kind of recognized character and the shape of a character font which may change depending on a maker are set so as to have the same size to thereby prevent a particular character from being in a half size at all times.

It is then determined whether a character is successive to its preceding one in the character storage place position calculation process. If so, a target place position is calculated as the preceding character position+the character size. If the character is determined to be not successive to the preceding one, a target place position is calculated from the coordinates of the preceding character and the place interval or spacing in the document image to thereby prevent the presence of an inadvertent blank between two characters. If the original document has a blank or void in a line thereof, a document which has a blank or void at a position corresponding to that in the original document is reproduced.

In the line information correction process, the CPU calculates the distance or interval between two adjacent lines and checks whether there is actually a corresponding one-line spacing between the two adjacent lines in the image or alternatively whether there is no spacing between the two adjacent lines in the actual image so as to correct the line positions and restore the read document image so as to have the same image as the original document.

In the ruled line position calculation process, the CPU calculates the distance between a target ruled line to be calculated at present and the line closest to the target ruled line and the distance between the target ruled line and a second ruled line present directly above the target ruled line, calculates the position of the target ruled line relative to the position of that of the closest line and the second ruled line which involves the shorter one of the two distances to thereby obtain the same ruled line position as the original document image, to ensure the positional relationship between the target ruled line and the related characters and to restore the original document image.

Thus, as described above, the character and ruled line data obtained from the document image data in the document reading process is stored in the document format memory 80. Thus, without setting the character code recognized from the read document image data, and format information about the line and place positions, sizes, and magnifications of the respective characters, the positions of ruled lines, etc., in the document image, a document format of an image close to that of the original document can be set automatically. The adjustment for format setting is facilitated.

Third Embodiment

The third embodiment of the inventive document image processor will be described in detail with reference to FIGS. 26–32.

Figure 26:
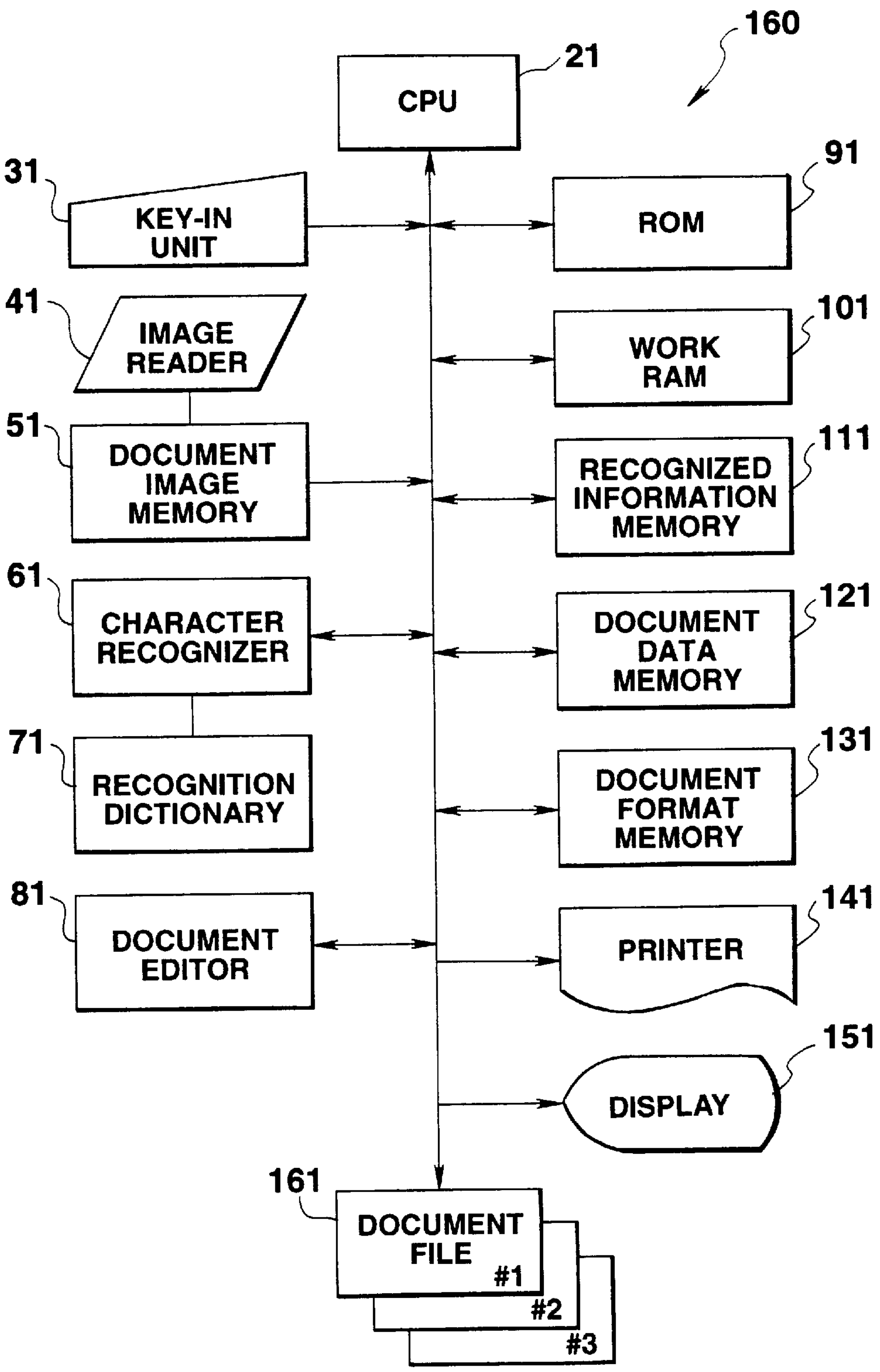

First, the structure of the third embodiment will be described. FIG. 26 is a block diagram of the document image processor 160. In FIG. 26, the document data processor 160 includes a CPU 21, key-in unit 31, image reader 41, document image memory 51, character recognizer 61, recognition dictionary 71, document editor 81, ROM 91, work RAM 101, recognized information memory 111, document data memory 121, document format memory 131, printer 141, display 151 and document file 161.

The CPU 21 controls the respective elements of the document data processor 160 in accordance with various control programs contained in the ROM 91, processes various document data, and displays the stages and results of the processing on the display 151.

The CPU 21 performs a document reading process in accordance with a document reading process program to be described later in more detail, and extracts character areas in units of a character from the document image data read by the image reader 41 and stored in the document image memory 51. The CPU 21 causes the document recognizer 61 to perform a character recognition process on the extracted character area, stores recognized information on all character recognition candidates, the position of printing paper, character size, etc., in the recognized information memory 111, and stores in the document data memory 121 data on the character code of a first candidate for the recognized character and the position address of the recognized information corresponding to the character code.

The CPU 21 performs an automatic format setting process to be described later in more detail to obtain data on the character point size of each character code, line interval, average inter-character place interval, and top and left margins stored in the recognition information memory 111 and stores those data in the document format memory 131.

The key-in unit 31 includes a cursor key, numeral input keys, character input keys and function keys, and outputs a signal indicative of the depression of a key to the CPU 21.

The image reader 41 causes a line image sensor (not shown) to scan a screen, to be read, at a predetermined speed to read image data for each line and outputs the image data to the document image memory 51, which has a memory area which stores the read document image data input from the image reader 41.

The character recognizer 61 is controlled by the CPU 21, recognizes a character extracted from the document image data which is stored in the document image memory 51, reads all the character candidates corresponding to the recognized character from the recognition dictionary 71, and stores all the read character candidates in the recognized information memory 111.

The recognition dictionary 71 stores character code data, and is used when the character recognizer 61 performs the character recognition process.

When the document editor 81 edits document data, the document editor 81 moves, copies, inserts and deletes the document data in units of (first candidate character code+recognition information position address) stored in the document data memory 121. When a character position is designated in the document, the document editor 81 performs a candidate replacement process to be described later to read all recognition candidates for the appropriate designated character from the recognized information memory 111 on the basis of the recognition information position address, and displays them, and replaces a selected candidate with a corresponding character code.

When acceptance of the document data on which the candidate replacement process has been performed is designated during edition of predetermined document data, the document editor 81 performs a document acceptance process to be described later in more detail, deletes recognized information position addresses attached to the respective codes of characters in the document to be accepted in order to fix those characters in accordance with the form of the acceptance (for example, "whole document", "character string unit") and copies the document data into a designated location.

The ROM 91 contains various control programs executed by the CPU 21, a document reading program, an automatic format setting program, and a candidate replacement program performed by the document editor 81, to be described later in more detail.

The work RAM 101 has a memory area where various data is disposed when the CPU 21 performs the various process programs. The recognized information memory 111 stores data on all the character recognition candidates recognized in the character recognition process performed by the character recognizer 61 and printing paper position and character sizes.

The document data memory 121 stores data on a character code of a first candidate for a character recognized in the document reading process performed by the CPU 21 and data on the position address of the recognized information corresponding to the character code.

The document format memory 131 stores document format data corresponding to the respective document data in the document data memory 121. More specifically, the document format memory 131 stores data on the character point size, line interval, average inter-character place interval, and top and left margins on the document image which is obtained in the automatic format setting process by the CPU 21.

The printer 141 prints out document data stored in the document data memory 121 in accordance with document format data stored in the document format memory 81 under control of the CPU 21. The display 151 displays the stages and results of the various document data processes performed by the CPU 21. The document file 161 stores document data on the document image for which the character recognition and document format setting process have ended.

Figure 27:
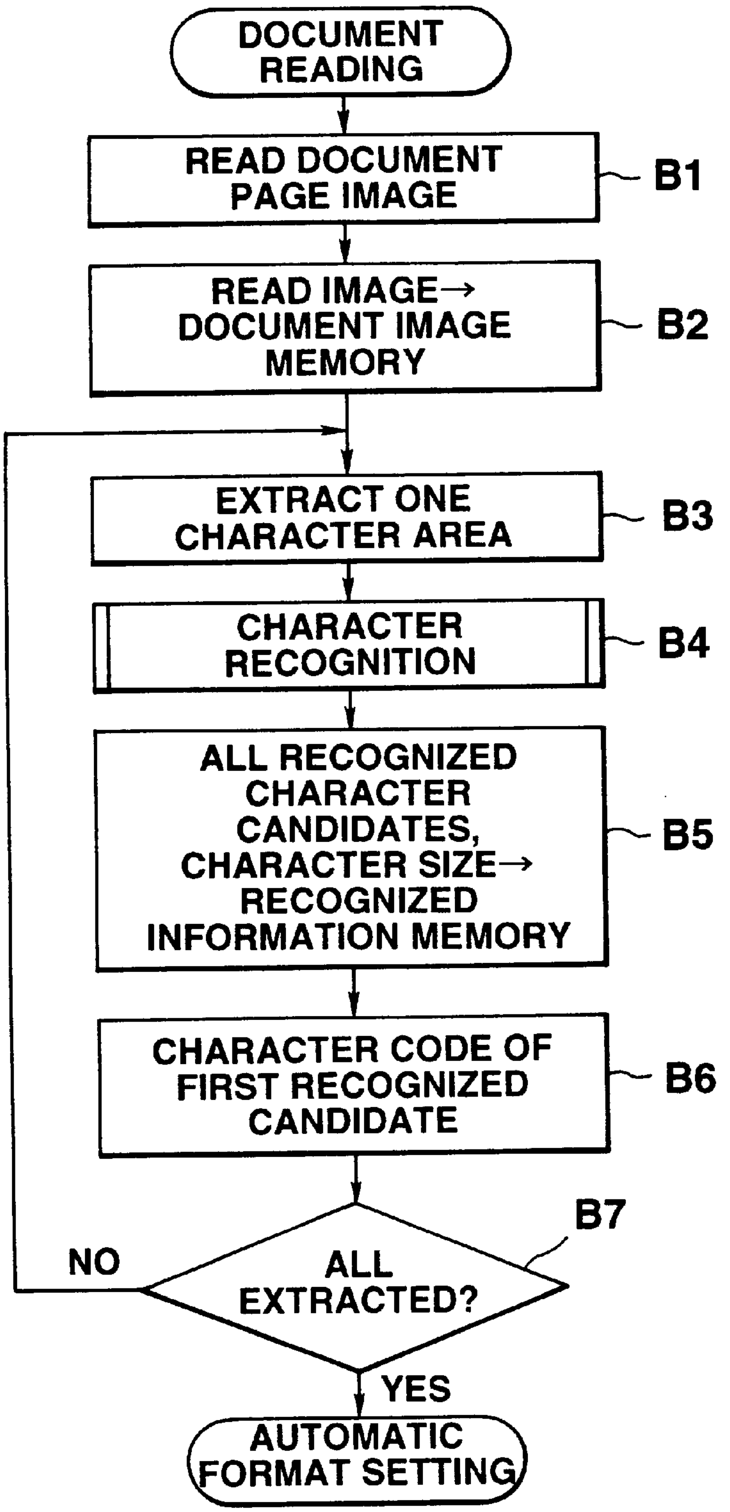

The operation of the third embodiment will be described next. First, the document reading process performed by the CPU 21 will be described with reference to a flow chart of FIG. 27. In FIG. 27, when the image reader 41 reads one page of a document (step B1), the CPU 21 stores image data on the read page into the document image memory 51 (step B2). The CPU 21 then extracts one character area from the stored document image data (step B3), and causes the character recognizer 61 to perform a character recognition process for a character in the extracted character area (step B4).

Figure 28:
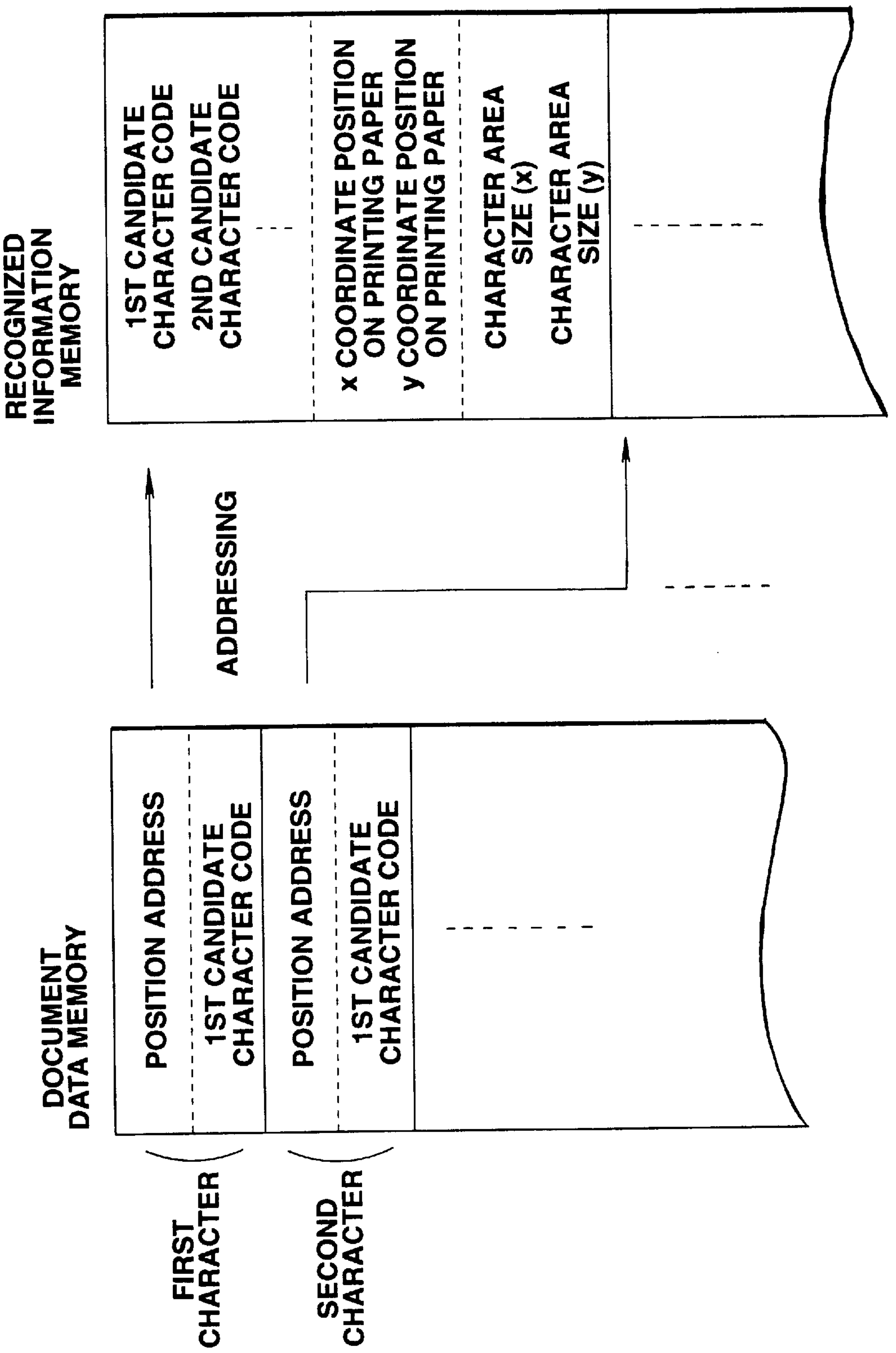

More specifically, the CPU 21 reads all the character candidates for the character in the extracted character area from the recognition dictionary 71, obtains data on the position (x, y coordinates) and the size (x, y sizes) of the character on the document page, and stores those data in the recognized information memory 111, as shown in FIG. 28 (step B5). The CPU 21 then stores in the document data memory 121 a character code of a first candidate for the recognized character and the position address in the recognized information memory 111 in which the recognized information corresponding to the character code is stored, as shown in FIG. 28 (step B6).

The CPU 21 then repeats the processing at steps B3–B6 until the character recognition process on all the character areas in the document ends (step B7) and shifts its operation to the automatic format setting process which will be described next with reference to a flow chart of FIG. 29.

Figure 29:
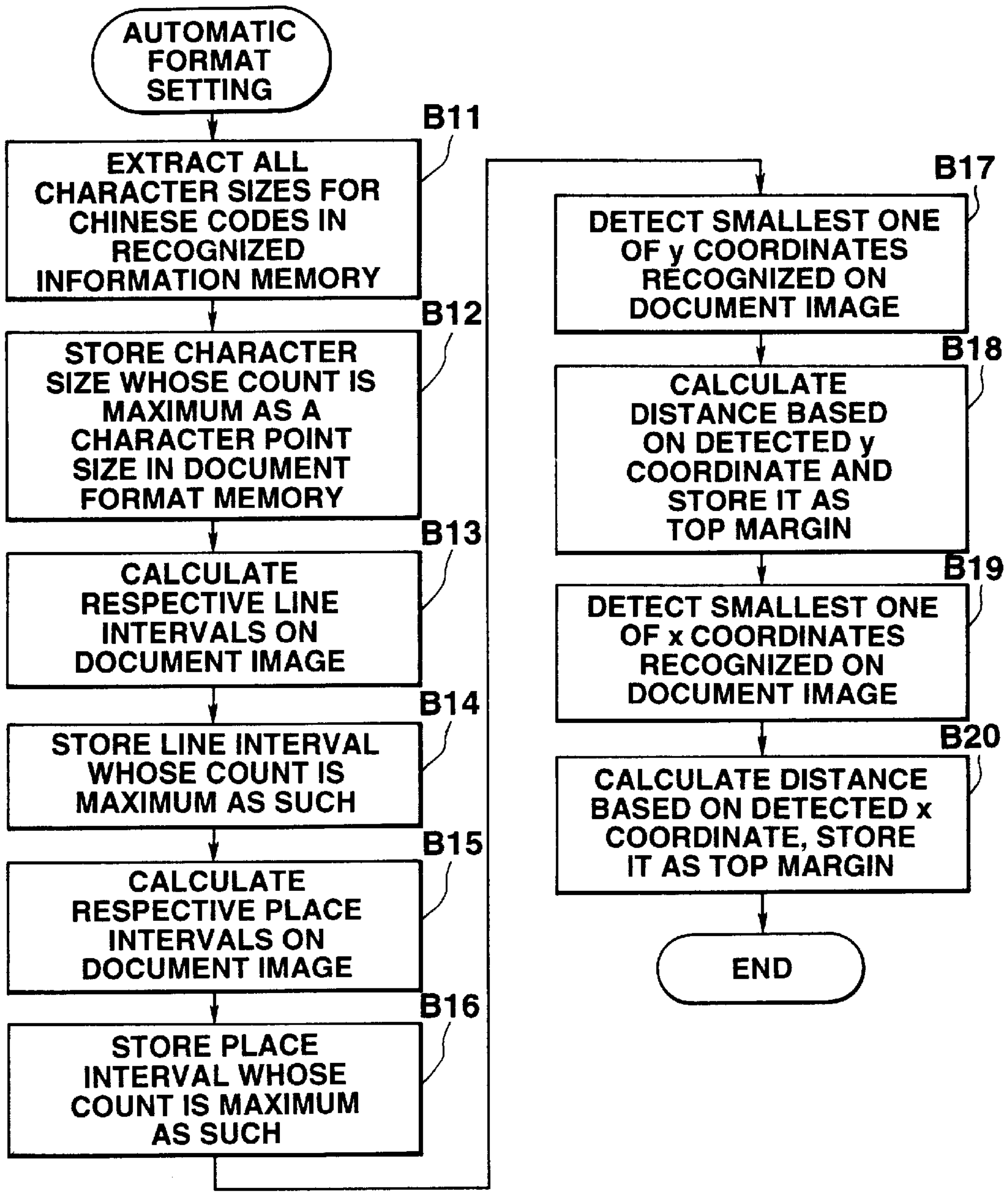

In FIG. 29, the CPU 21 first extracts all the character sizes (x, y sizes) for the respective Chinese ones of the character codes in the recognized information memory 111 (step B11), and stores a character size whose count is maximum as a character point size in the document format memory 131 (step B12). The CPU then calculates the respective line intervals on the document image stored in the document image memory 51 from the respective y coordinates of the line positions (step B13), stores data on a line interval whose count is maximum as such in the document format memory 131 (step B14), calculates the respective place intervals on the same document image from the x coordinates of the character positions (step B15), and stores data on a place interval whose count is maximum as such in the document format memory 131 (step B16).

The CPU 21 then detects the smallest one of the y coordinates of the character positions recognized on the document image (step B17), calculates a distance (the number of y dots) corresponding to a top margin of the document on the basis of the detected y coordinate and stores data on the calculated distance as top margin in the document format memory 131 (step B18). The CPU 21 then detects the smallest one of the x coordinate of the character positions recognized on the document image (step B19), calculates a distance (the number of x dots) corresponding to a left margin of the document on the basis of the detected x coordinate, and stores data on the calculated distance as a left margin in the document format memory 131 (step B20) to thereby end the present process. That is, the automatic format setting for the read document image is terminated.

Figure 30:
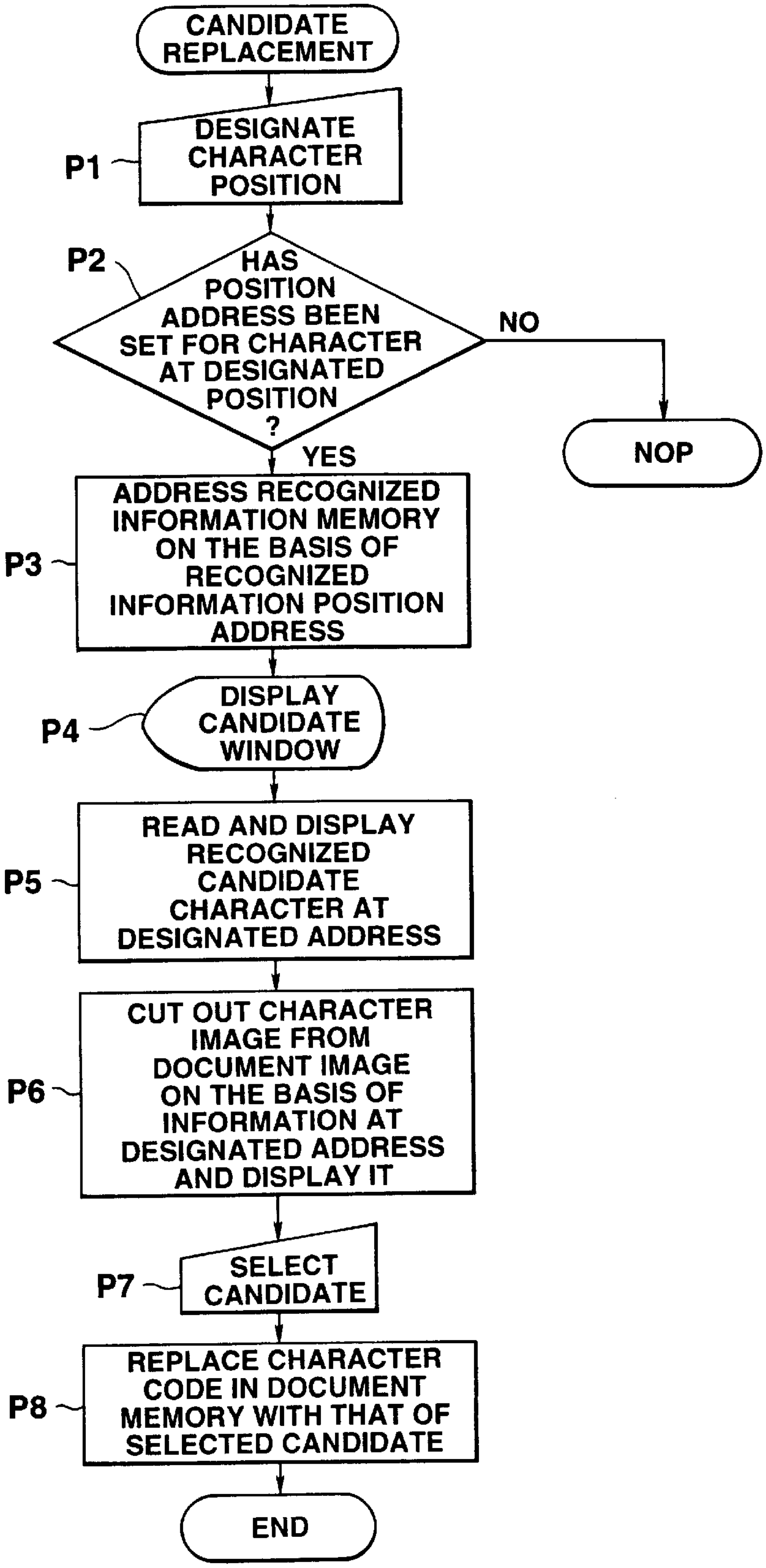
Figure 31:
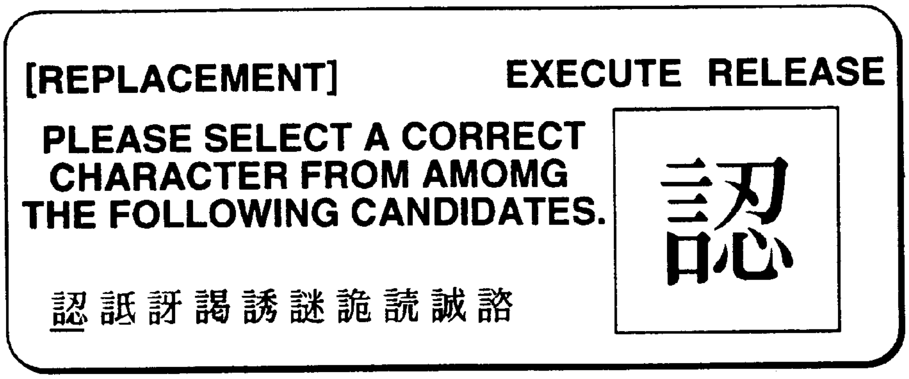

A candidate replacement process performed by the document editor 81 in the edition process will be described with reference to a flow chart of FIG. 30. In FIG. 30, first, when the position of a character in the document for which the character recognition has ended is designated by the depression of a predetermined key at the key-in unit 31 (step P1), the CPU 21 determines whether a recognized information position address has been set for that designated character by referring to data in the document data memory 121 (step P2). If not, the CPU 21 interrupts this process. If the recognized information position address has been set, the CPU designates an address in the recognized information memory 111 on the basis of the recognized information position address (step P3), displays a candidate window on the display 151, as shown in FIG. 31 (step P4), and reads all candidates for the recognized character stored at that address and displays them in the candidate window (step P5). The CPU 21 then cuts out a character image from the document image on the basis of information on the designated address, and displays the character image to enlarged scale, as shown in FIG. 31 (step P6).

When a character candidate is selected in the candidate window of FIG. 31 (the selected character candidate is displayed with an underline in FIG. 31) (step P7), the CPU 21 replaces the character code stored in the document data memory 121 with the character code of the selected character candidate (step P8) to thereby end the present process.

A document acceptance process performed by the document editor 81 when the acceptance of the document data on which the candidate replacement process has been performed is designated during the edition of the predetermined document data will be described with reference to a flow chart of FIG. 32.

Figure 32:
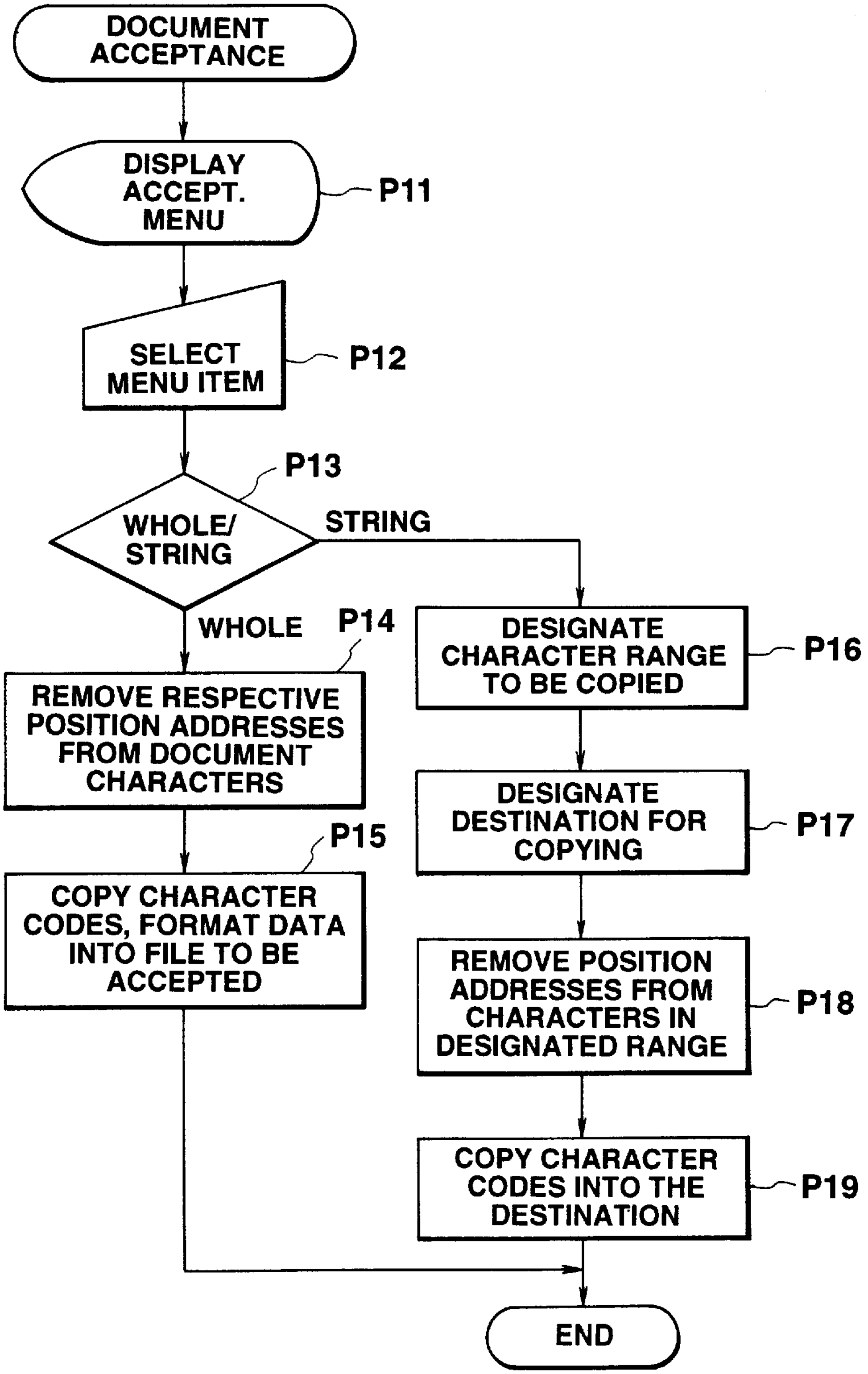

In FIG. 32, when the acceptance of a document is designated by the operation of a predetermined key of the key-in unit 31, the CPU 21 displays a document acceptance menu (for example, requesting the selection of a "whole document" or "character string unit") on the display 151 (step P11). When an item of the displayed menu is selected (step P12), the CPU 21 determines whether the selected item of the menu is the "whole document" or "character string unit" (step P13).

When the "whole document" is selected, the CPU 21 reads data on the respective codes and position addresses of the characters in the document to be accepted from the document data memory 121, removes data on the position addresses (step P14), reads data on the character codes free from the position addresses and the corresponding document format data from the document format memory 131 and copies those data into a document file to be accepted (step P15) to thereby end the present process.

When the "character string unit" is selected, the CPU 21 recognizes the designation of the range of characters to be copied and a destination for copying the designated range of characters (steps P16, P17), reads the codes and position addresses of the respective characters in the designated range from the document data memory 121, removes the position addresses (step P18), copies the character codes free from their position addresses into the file for the document to be accepted (step P19) to thereby end the present process.

Thus, in the document reading process, by reflecting in the final document information (on candidate characters, absolute positions on the printing paper, character sizes) obtained as the result of recognition of characters from the document image data, a document which has reproduced the original document format faithfully is created, and the user can automatically set a document format close to that of the original document image without setting any format information to thereby require no adjustment for the format setting and greatly improve the efficiency of the operation.

When edition (movement, copying, deletion, ornament, etc.) is performed on the original document, the editor 81 together processes a designated character and a position address indicative of a location where the recognized character candidate of the designated character is stored in the character recognition, and manages the candidate position of the recognized character as character information like character ornament information such as underline or half-tone dot meshing. Thus, even in the edited document, a character candidate replacement function which is a function inherent in the character recognition can be utilized. In this case, if there is no appropriate character in the stored candidates, the character candidate can be corrected on the spot by deletion and inputting to thereby greatly improve operability when the recognized character candidate is replaced.

In the document acceptance process which accepts a document whose wrongly replaced character candidate has been corrected, the position address processed together with the character candidate is deleted. Thus, information on a recognized document in which the amount of the document data to be stored in the document file is reduced can be accepted.

What is claimed is:

1. A word processor comprising:

a memory;

character extracting and recognizing means for scanning a document image which includes a plurality of character images appearing on a document page, for extracting one at a time the plurality of character images on the scanned document page, for producing a plurality of x and y coordinates corresponding to the extracted plurality of character images, for recognizing one at a time the plurality of character images to produce a plurality of character codes, and for causing said memory to store the produced plurality of character codes as document data;

document form producing means for accessing the x and y coordinates produced by said character extracting and recognizing means, for calculating distances each between respective y-coordinates corresponding to two adjacent ones of the characters images, and for producing line spacing data for printing the document data based on one of: (i) a one of the calculated distances which occurs most frequently, and (ii) an average of the calculated distances;

form storage means for storing the line spacing data produced by said document form means as document form data; and print control means for reading respective ones of the plurality of character codes stored as the document data in said memory, for developing the read plurality of character codes into a corresponding plurality of print character patterns, for rearranging the developed plurality of print character patterns in accordance with the line spacing data stored as the document form data in said form storage means, and for outputting for printing purposes the rearranged print character patterns.

2. The word processor according to claim 1, wherein:

said document form producing means also calculates distances each between x-coordinates of respective ones of the character coordinates corresponding to two adjacent ones of the characters images, and produces paper direction data based on a comparison of respective ones of the calculated y-coordinate distances and the calculated x-coordinate distances, and further produces arrangement direction data based on all of the plurality of character coordinates; and said print control means rearranges the developed plurality of print character patterns in accordance with the paper direction data and the arrangement direction data as well as the line spacing data.

3. A word processor comprising:

a memory;

character extracting and recognizing means for scanning a document image which includes a plurality of character images appearing on a document page, for extracting one at a time the plurality of character images on the scanned document page, for producing a plurality of x and y coordinates corresponding to the extracted plurality of character images, for recognizing one at a time the plurality of character images to produce a plurality of character codes, and for causing said memory to store the produced plurality of character codes as document data;

document form producing means for accessing the x and y coordinates produced by said character extracting and recognizing means, for producing left margin data based on a smallest one of the x-coordinates, and for producing top margin data based on a smallest one of the y-coordinates;

form storage means for storing the left margin data and the top margin data produced by said document form producing means as document form data for printing the document data; and print control means for reading respective ones of the plurality of character codes stored as the document data in said memory, for developing the read plurality of character codes into a corresponding plurality of print character patterns, for rearranging the developed plurality of print character patterns in accordance with the left margin data and the top margin data stored as the document form data in said form storage means, and for outputting for printing purposes the rearranged print character patterns.

4. A word processing method comprising:

scanning a document image which includes a plurality of character images appearing on a document page, extracting one at a time the plurality of character images on the scanned document page, producing a plurality of x and y coordinates corresponding to the extracted plurality of character images, recognizing one at a time the plurality of character images to produce a plurality of character codes, and storing the produced plurality of character codes as document data;

accessing the produced plurality of character coordinates, calculating distances each between respective y-coordinates corresponding to two adjacent ones of the characters images, producing line spacing data based on at least one of the calculated distances, producing left margin data based on a smallest one of the x-coordinates, and producing top margin data based on a smallest one of the y-coordinates;

storing as the produced line spacing data, paper direction data and arrangement direction data as document form data for printing the document data; and reading respective ones of the plurality of character codes stored as the document data, developing the read plurality of character codes into a corresponding plurality of print character patterns, rearranging the developed plurality of print character patterns in accordance with the line spacing data, the left margin data and the top margin data stored as the document form data, and outputting for printing purposes the rearranged print character patterns.

* * * * *